(12) United States Patent
Moore

(10) Patent No.: US 9,933,109 B2
(45) Date of Patent: Apr. 3, 2018

(54) VIBRATION RESISTANT EQUIPMENT MOUNT

(71) Applicant: DGM Enterprises LLC, Cedar, MN (US)

(72) Inventor: Gary L. Moore, Cedar, MN (US)

(73) Assignee: DGM ENTERPRISES LLC, Cedar, MN (US)

( * ) Notice: Subject to any disclaimer, the term of this patent is extended or adjusted under 35 U.S.C. 154(b) by 0 days.

(21) Appl. No.: 15/172,348

(22) Filed: Jun. 3, 2016

(65) Prior Publication Data

US 2016/0356415 A1    Dec. 8, 2016

Related U.S. Application Data

(60) Provisional application No. 62/170,388, filed on Jun. 3, 2015.

(51) Int. Cl.
| | | |
|---|---|---|
| *A47B 96/06* | (2006.01) | |
| *F16M 13/02* | (2006.01) | |
| *F16M 11/20* | (2006.01) | |
| *F16M 11/08* | (2006.01) | |

(52) U.S. Cl.
CPC ............ *F16M 13/02* (2013.01); *F16M 11/08* (2013.01); *F16M 11/2064* (2013.01); *F16M 2200/024* (2013.01)

(58) Field of Classification Search
USPC ...................................................... 248/205.1
See application file for complete search history.

(56) References Cited

U.S. PATENT DOCUMENTS

| | | | |
|---|---|---|---|
| 2,200,183 | A | 5/1940 | Legg |
| 2,319,377 | A | 5/1943 | Wallace |
| 2,477,270 | A | 7/1949 | Smith |
| 2,549,429 | A | 4/1951 | Cowles |
| 2,650,788 | A | 9/1953 | Hulstein |
| 2,682,127 | A | 6/1954 | Binder |
| 2,733,492 | A | 2/1956 | Copell |
| 2,867,003 | A | 1/1959 | Stiles |
| 2,920,665 | A | 1/1960 | Hutson |
| 3,234,634 | A | 2/1966 | Johnson |
| 3,509,882 | A | 5/1970 | Blake |
| 3,792,829 | A | 2/1974 | Fickett |
| 4,066,231 | A | 1/1978 | Bahner |
| 4,118,003 | A | 10/1978 | Dillow |
| 4,233,730 | A | 11/1980 | Godbe |
| 4,592,526 | A | 6/1986 | Kobelt |
| 4,798,294 | A | 1/1989 | Bodi |
| 4,802,708 | A | 2/1989 | Vos |
| 4,803,759 | A | 2/1989 | Kemble |

(Continued)

*Primary Examiner* — Monica E Millner
(74) *Attorney, Agent, or Firm* — Patterson Thuente Pedersen, P.A.

(57) ABSTRACT

A vibration resistant, positionable equipment mount. The positionable equipment mount including a platform mount, an equipment mount, a first and second pivot clamp, and one or more bars operably coupled to the first and second pivot clamp via ratcheting elbow mounts, wherein the internal bore of the first and second pivot clamps each have an interior circumferential surface characterized by teeth configured to mesh with splines on the respective shafts of the platform and equipment mounts to form ratcheting pivots.

18 Claims, 20 Drawing Sheets

(56) References Cited

U.S. PATENT DOCUMENTS

| | | | |
|---|---|---|---|
| 4,834,329 A * | 5/1989 | Delapp | F16M 11/10 248/183.3 |
| 4,928,916 A | 5/1990 | Molloy | |
| 4,957,264 A | 9/1990 | Hakanen | |
| 4,976,721 A | 12/1990 | Blasnik | |
| 4,977,660 A | 12/1990 | Maynard | |
| 5,024,408 A | 6/1991 | Magee | |
| 5,148,590 A | 9/1992 | Wu | |
| 5,149,032 A | 9/1992 | Jones | |
| 5,156,430 A | 10/1992 | Mori | |
| 5,207,791 A * | 5/1993 | Scherbarth | A63F 13/08 224/270 |
| 5,228,737 A | 7/1993 | Zimmerman | |
| 5,367,815 A | 11/1994 | Liou | |
| 5,457,745 A | 10/1995 | Wang | |
| 5,551,660 A | 9/1996 | Leduchowski | |
| 5,582,377 A | 12/1996 | Quesada | |
| 5,653,414 A | 8/1997 | Chimel | |
| 5,673,628 A | 10/1997 | Boos | |
| 5,713,117 A | 2/1998 | Bliss | |
| 5,733,061 A | 3/1998 | Child | |
| 5,788,202 A | 8/1998 | Richter | |
| 5,793,614 A | 8/1998 | Tollbom | |
| 5,819,379 A | 10/1998 | Van Hout | |
| 5,845,885 A | 12/1998 | Carnevali | |
| 5,850,680 A | 12/1998 | Verrier | |
| 5,903,645 A | 5/1999 | Tsay | |
| 5,917,907 A | 6/1999 | Kela | |
| 5,964,439 A | 10/1999 | Johnson | |
| 5,964,443 A | 10/1999 | Leveille | |
| 6,032,337 A | 3/2000 | Rankin, Jr. | |
| 6,076,790 A | 6/2000 | Richter | |
| 6,095,470 A | 8/2000 | Kalis | |
| 6,173,933 B1 | 1/2001 | Whiteside | |
| 6,213,438 B1 | 4/2001 | Ostby | |
| 6,229,893 B1 | 5/2001 | Chen | |
| 6,286,797 B1 | 9/2001 | Thaxton | |
| 6,370,741 B1 | 4/2002 | Lu | |
| 6,427,959 B1 | 8/2002 | Kalis | |
| 6,446,923 B1 | 9/2002 | Olkkola | |
| 6,571,507 B2 | 6/2003 | Elford | |
| 6,598,544 B2 | 7/2003 | Laws | |
| 6,600,827 B2 | 7/2003 | Lu | |
| 6,619,872 B2 | 9/2003 | Crorey | |
| 6,629,801 B2 | 10/2003 | Cheng | |
| 6,647,248 B1 | 11/2003 | Ortscheid | |
| 6,691,965 B1 | 2/2004 | Lin | |
| 6,785,567 B2 | 8/2004 | Kato | |
| 6,786,461 B1 * | 9/2004 | Tsai | A47B 21/0371 248/118.3 |
| 6,802,848 B2 | 10/2004 | Anderson | |
| 6,814,377 B2 | 11/2004 | Silverman | |
| 6,817,587 B2 | 11/2004 | Lin | |
| 6,966,533 B1 | 11/2005 | Kalis | |
| 7,017,243 B2 | 3/2006 | Carnevali | |
| 7,032,872 B2 | 4/2006 | Sullivan | |
| 7,243,892 B2 * | 7/2007 | Pfister | F16M 11/10 248/281.11 |
| 7,264,212 B2 * | 9/2007 | Hung | F16M 11/10 248/184.1 |
| 7,303,171 B1 * | 12/2007 | Chen | B60R 11/00 224/908 |
| 7,406,795 B1 | 8/2008 | Follmar | |
| 7,461,826 B2 | 12/2008 | Carnevali | |
| 7,523,528 B2 | 4/2009 | Carnevali | |
| 7,523,904 B2 * | 4/2009 | Carnevali | F16C 11/10 248/176.1 |
| 7,746,649 B2 | 6/2010 | Miller | |
| 7,770,857 B2 | 8/2010 | Ruddy | |
| 7,774,973 B2 * | 8/2010 | Carnevali | A01K 97/10 248/276.1 |
| 7,898,374 B2 | 3/2011 | Miller | |
| 8,056,874 B2 * | 11/2011 | Goodwin | A61G 5/10 248/276.1 |
| 8,146,879 B2 | 4/2012 | Liao | |
| 8,156,681 B2 | 4/2012 | Carnevali | |
| 8,176,603 B2 | 5/2012 | Carnevali | |
| 8,177,178 B2 | 5/2012 | Carnevali | |
| 8,235,340 B2 | 8/2012 | Carnevali | |
| 8,289,113 B2 | 10/2012 | Miller | |
| 8,544,161 B2 | 10/2013 | Carnevali | |
| 8,622,359 B2 | 1/2014 | Carnevali | |
| 8,649,169 B2 | 2/2014 | Kwon | |
| 8,651,437 B2 | 2/2014 | Liu | |
| 8,867,202 B2 | 10/2014 | Williams | |
| 8,929,065 B2 | 1/2015 | Williams | |
| 8,967,561 B2 * | 3/2015 | Cheng | F16M 11/041 248/176.1 |
| 9,098,239 B2 | 8/2015 | Williams | |
| 9,108,096 B2 | 8/2015 | Solheim | |
| 9,255,660 B2 | 2/2016 | Zhang | |
| 9,310,841 B2 | 4/2016 | Williams | |
| 9,316,346 B2 * | 4/2016 | Lau | F16M 11/126 |
| 2001/0046409 A1 * | 11/2001 | Fischer | B60R 11/02 403/92 |
| 2004/0022388 A1 | 2/2004 | Chan | |
| 2005/0006542 A1 * | 1/2005 | Henning | F16C 11/10 248/274.1 |
| 2006/0011795 A1 * | 1/2006 | Dobbins | B60R 11/00 248/276.1 |
| 2006/0157627 A1 * | 7/2006 | Hung | F16C 11/10 248/276.1 |
| 2006/0278785 A1 | 12/2006 | Wiesner | |
| 2007/0137008 A1 | 6/2007 | Anstee | |
| 2007/0280779 A1 | 12/2007 | Ruddy | |
| 2008/0061197 A1 * | 3/2008 | Carnevali | F16M 11/14 248/181.1 |
| 2008/0155881 A1 | 7/2008 | Carnevali | |
| 2008/0164831 A1 | 7/2008 | Miller | |
| 2008/0256839 A1 | 10/2008 | Follmar | |
| 2008/0302938 A1 | 12/2008 | Goodwin | |
| 2009/0212184 A1 * | 8/2009 | Bourgeois | F16M 11/10 248/288.11 |
| 2009/0224122 A1 * | 9/2009 | Liao | B60R 11/0252 248/292.13 |
| 2010/0059650 A1 | 3/2010 | Kaneko | |
| 2010/0073885 A1 | 3/2010 | Miller | |
| 2010/0258695 A1 | 10/2010 | Wu | |
| 2011/0107606 A1 | 5/2011 | Shan | |
| 2011/0116241 A1 | 5/2011 | Miller | |
| 2011/0297196 A1 | 12/2011 | Durante | |
| 2012/0127651 A1 | 5/2012 | Kwon | |
| 2012/0153789 A1 | 6/2012 | Liu | |
| 2012/0317776 A1 | 12/2012 | Carnevali | |
| 2012/0318937 A1 | 12/2012 | Carnevali | |
| 2013/0032679 A1 | 2/2013 | Ward | |
| 2014/0178123 A1 | 6/2014 | Hamilton | |
| 2015/0034789 A1 | 2/2015 | Ferguson | |
| 2015/0041510 A1 | 2/2015 | Frenzel | |
| 2015/0192242 A1 | 7/2015 | Zhang | |

* cited by examiner

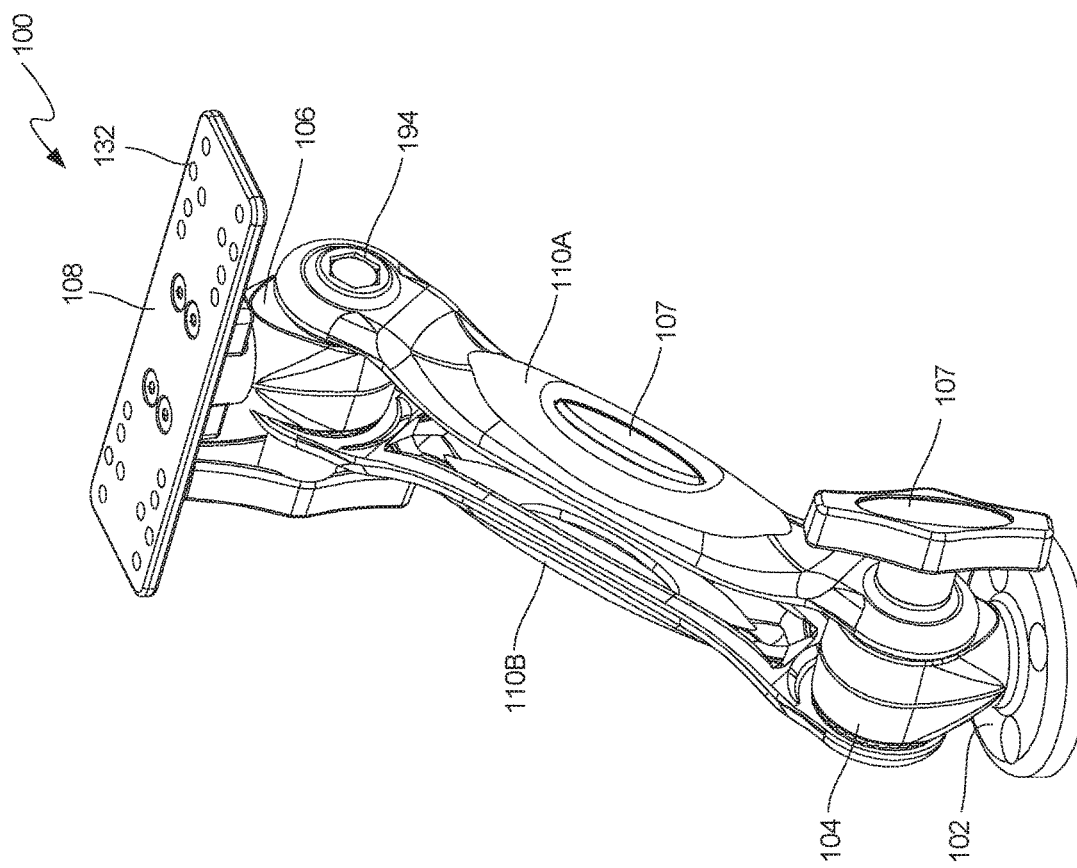

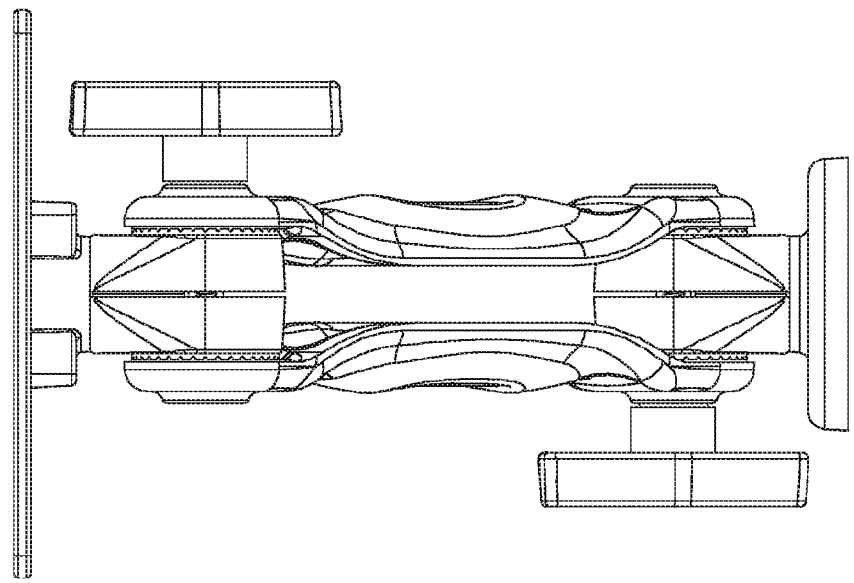
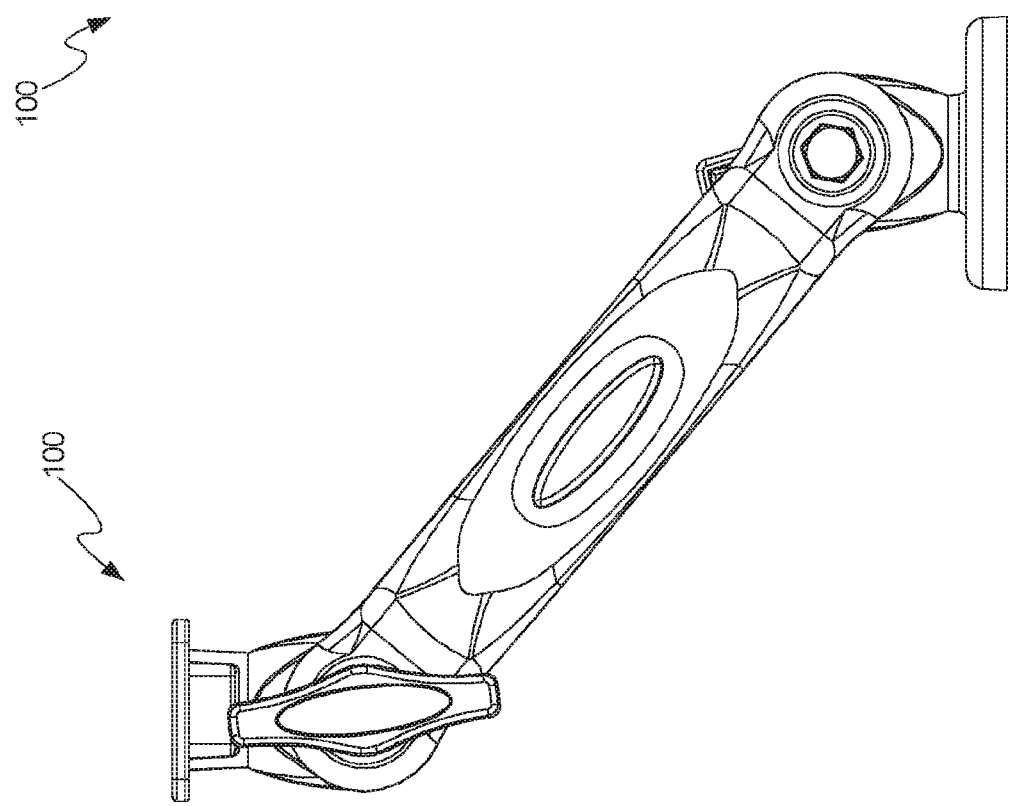
Fig. 1E
Fig. 1D

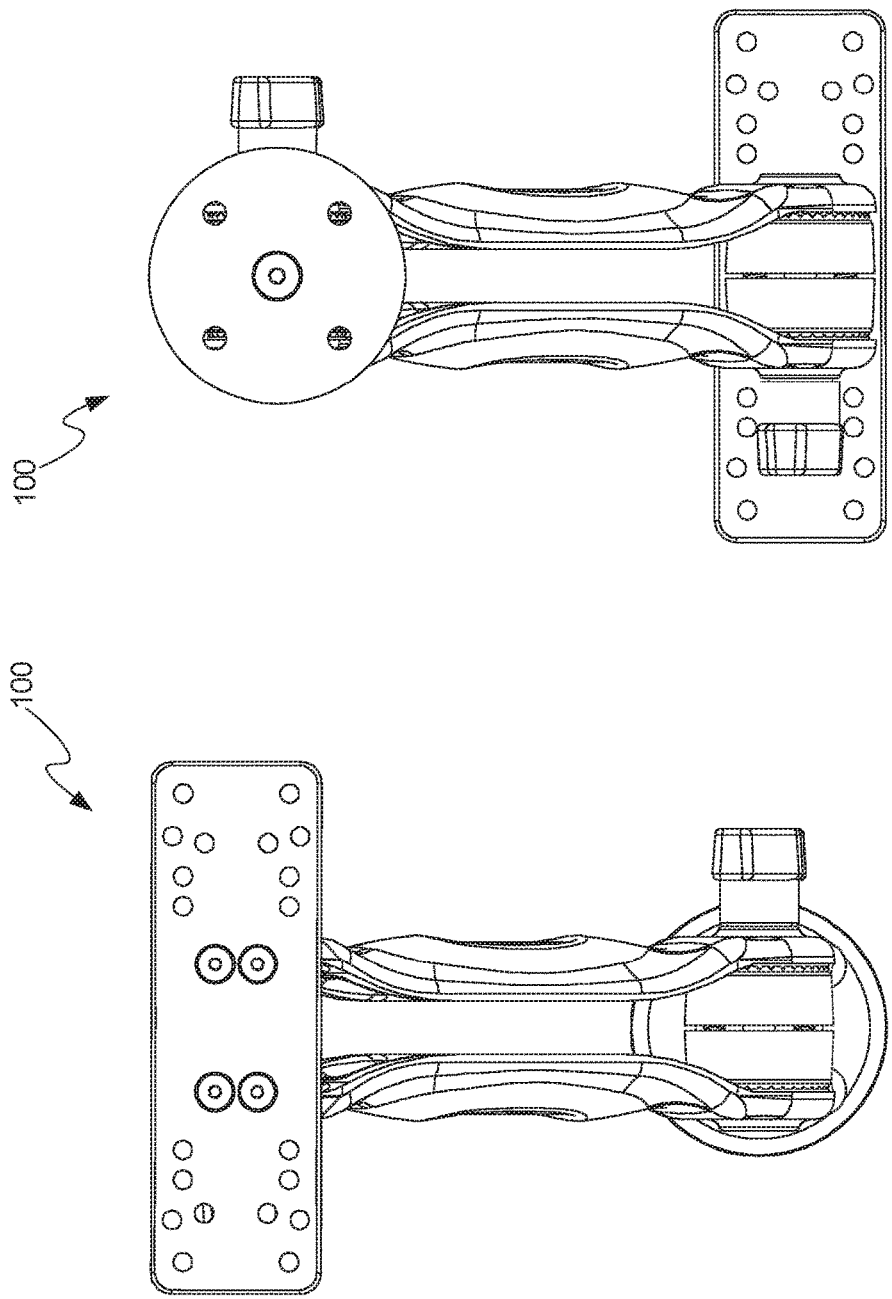

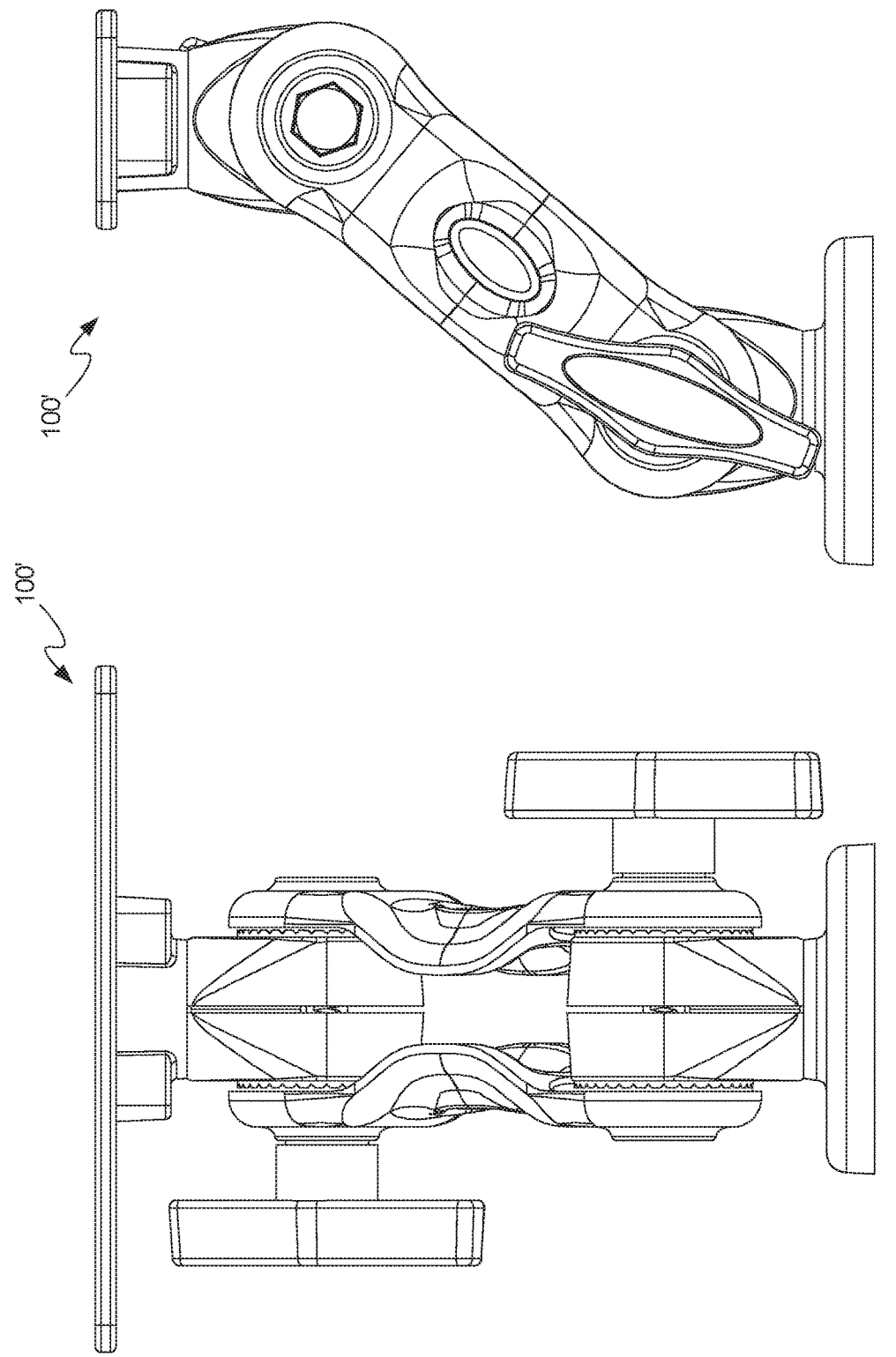

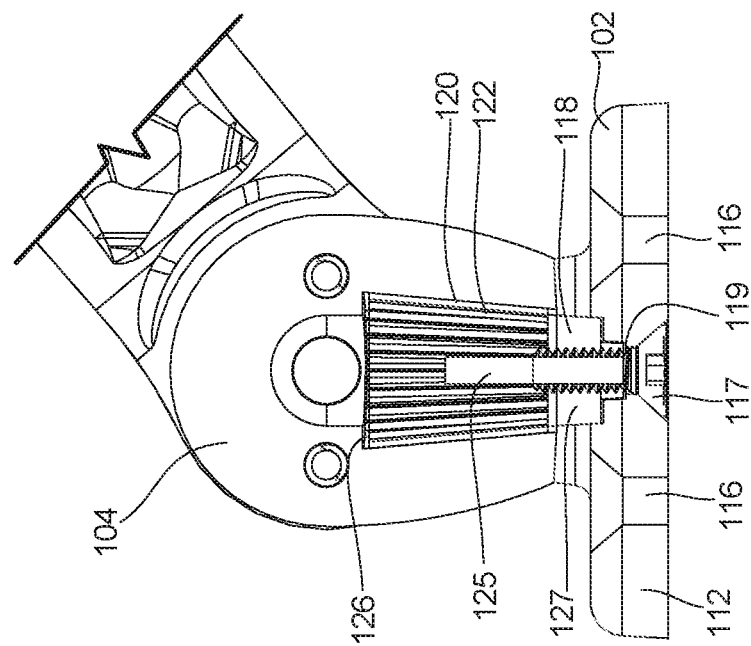
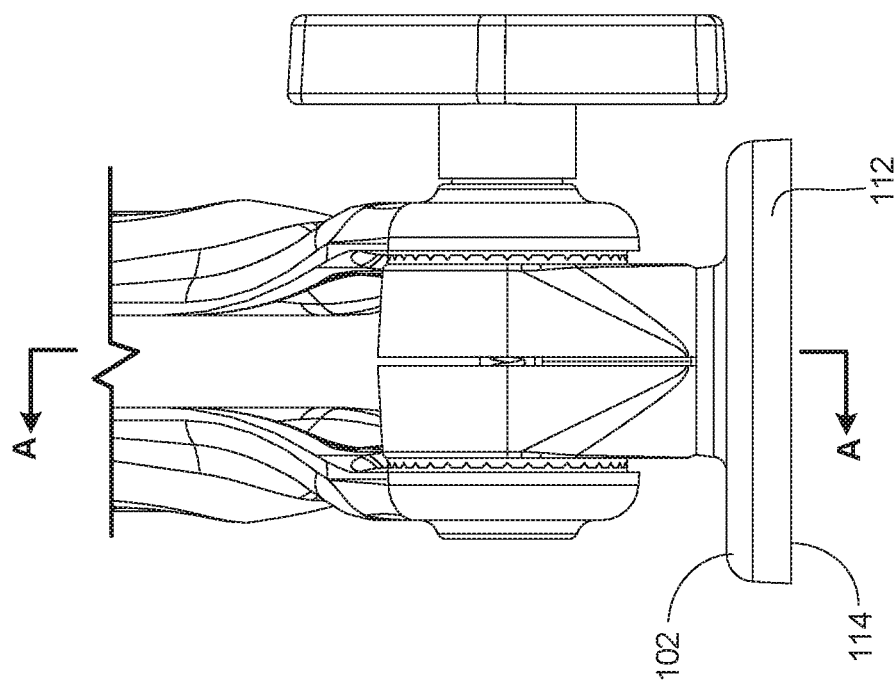
Fig. 3B
Fig. 3A

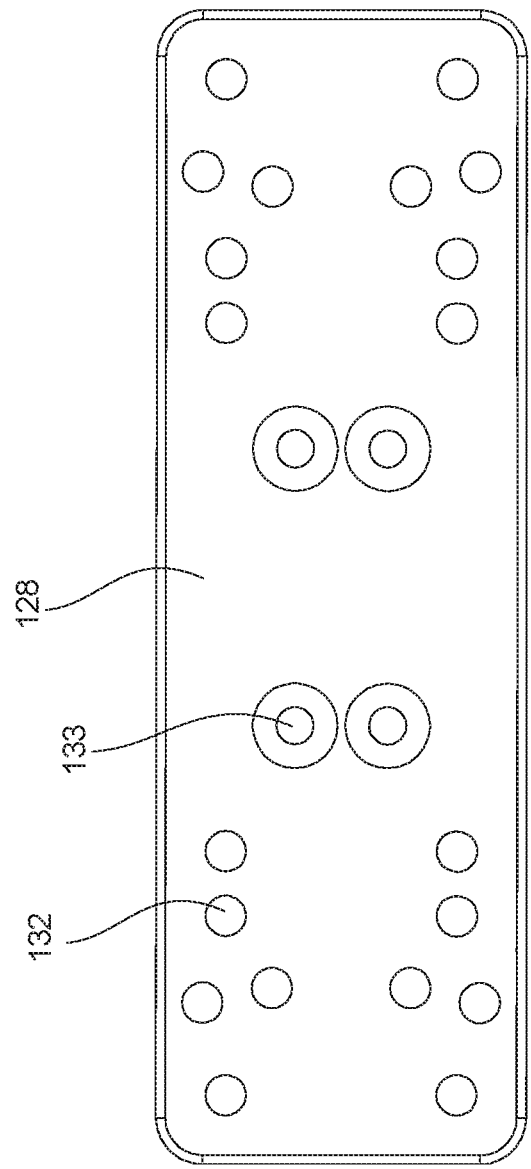

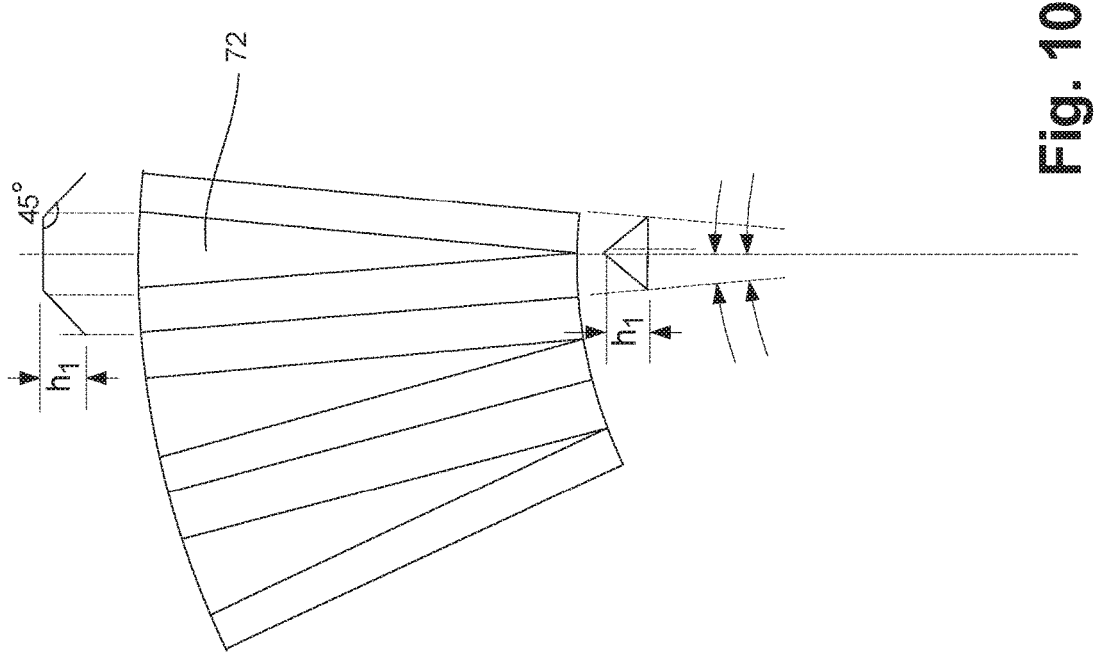

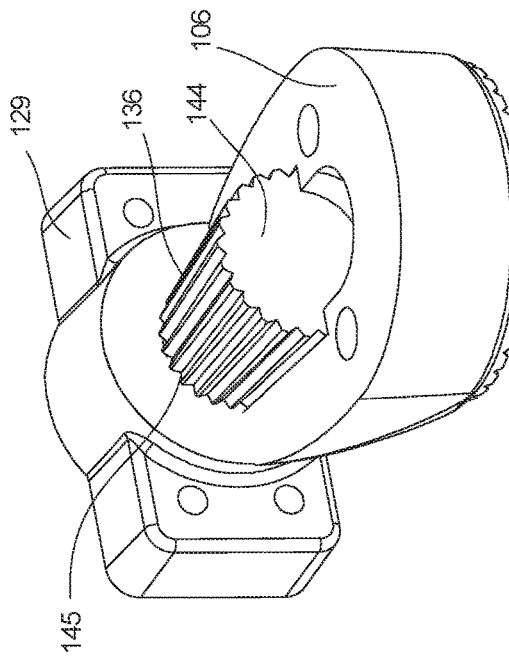
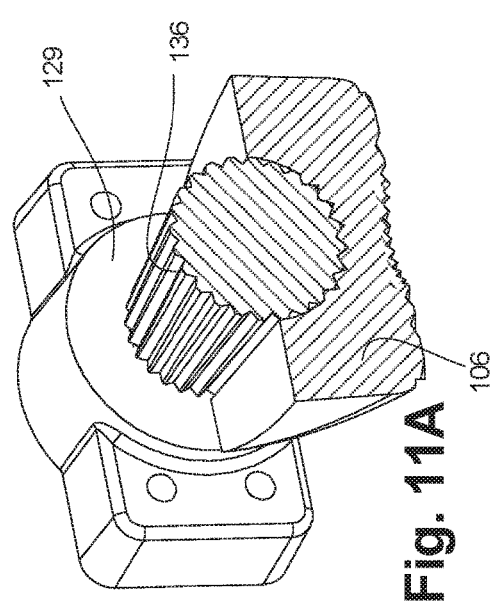
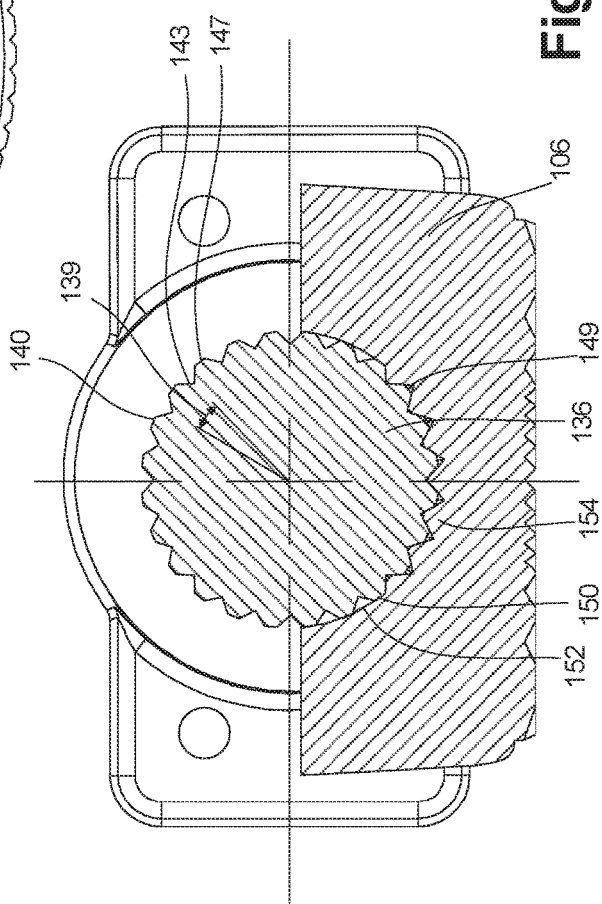

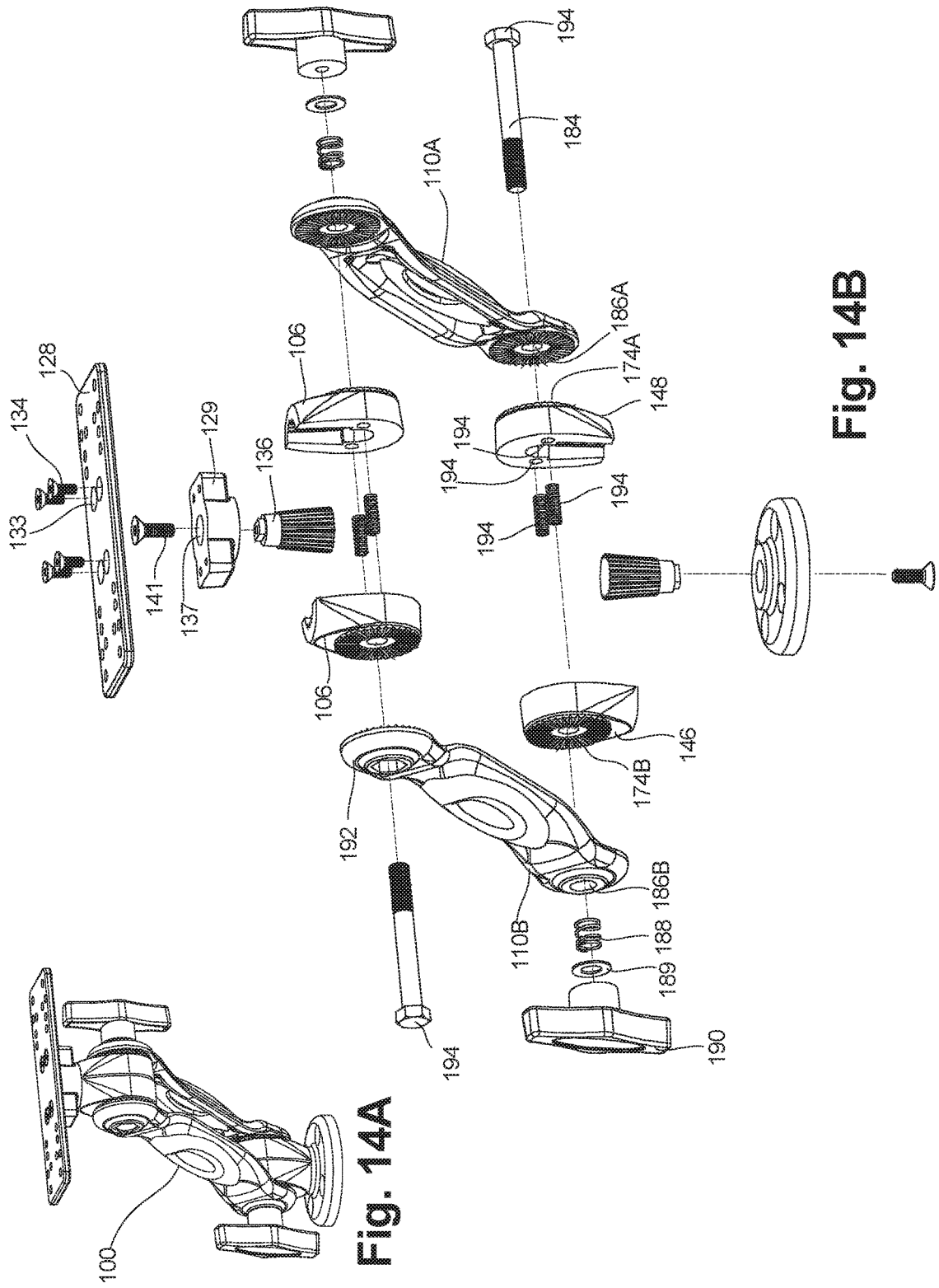

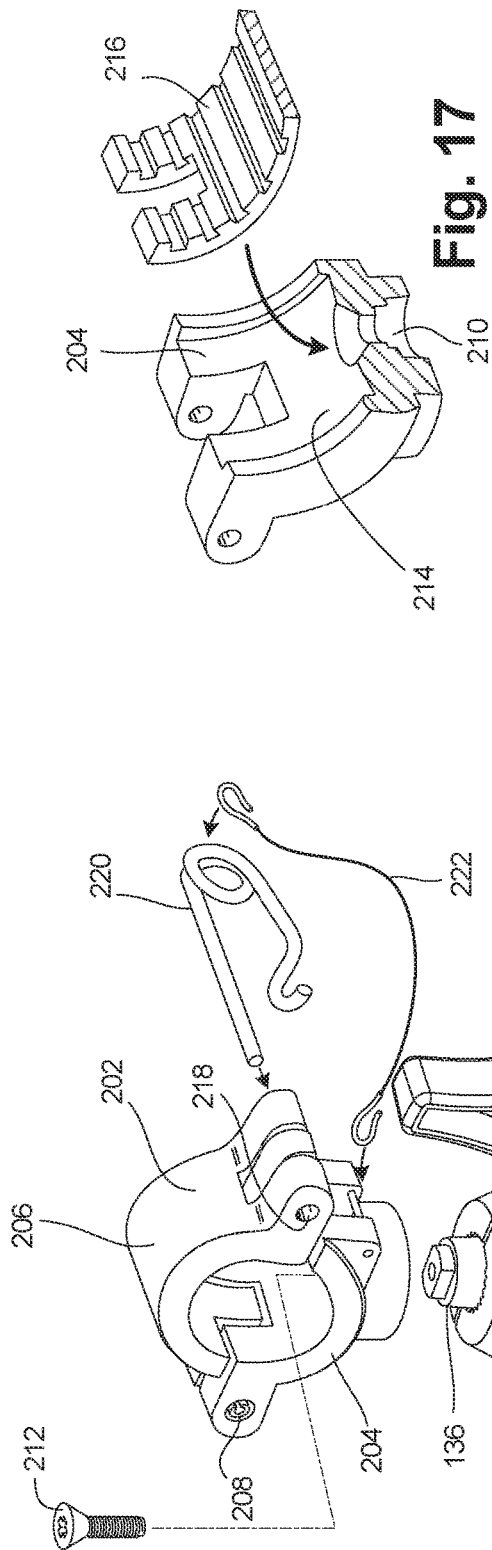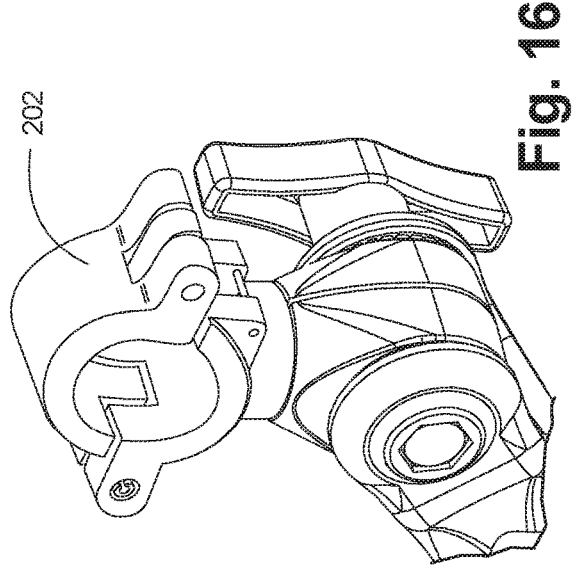

VIBRATION RESISTANT EQUIPMENT MOUNT

RELATED APPLICATION

The present application claims the benefit of U.S. Provisional Application No. 62/170,388 filed Jun. 3, 2015, which is hereby incorporated herein in its entirety by reference.

TECHNICAL FIELD

The present disclosure relates generally to a mechanical adjustable mounting device. More particularly, the present disclosure relates to a shock and vibration resistant ratcheting mounting device for supporting equipment relative to a platform.

BACKGROUND

Mounting devices for providing a positionable mounting platform in and on different industrial, commercial and recreation mobile platforms, such as boats, on-road and off-road vehicles, and aircraft, as well as fixed platforms, such as floors, walls, and work bench surfaces are well known in the art. These positionable mounting platforms are typically structured to support a wide variety of equipment, tools and other mobile devices for conventional mounting. Conventional mounting platforms of this type are disclosed, for example, in U.S. Pat. Nos. 5,845,885 and 7,461,826, both of which are incorporated by reference herein.

A drawback to conventional mounting platforms, however, is that they are prone to becoming loose when subjected to shock or heavy vibration. For example, when a piece of equipment, such as a GPS, chartplotter, or fishfinder is mounted to a mobile platform, such as a boat, it is common that the equipment will move out of its desired position relative to the mobile platform when subjected to the shock of traversing waves or rough waters. Conventional mounting platforms, such as the type disclosed above, often rely on at least one friction fitting gripping a ball or partial sphere to maintain the position of the piece of equipment relative to the platform. As a result, users are often forced to readjust the position or remount equipment after experiencing heavy vibration.

Accordingly, what is needed in the industry is an improved, positionable mounting platform capable of withstanding shock and heavy vibration. Moreover, what is needed in the industry is a low cost, adaptable, improved, positionable mounting platform that can be easily adjusted to provide a wide range of available positions for holding equipment in a stable, fixed position over long periods of use, relative to a platform, particularly when subjected to shock and heavy vibration during the time interval of interest.

SUMMARY OF THE DISCLOSURE

Embodiments of the present disclosure meet the need of the industry for a low cost, adaptable, improved, positionable mounting platform that can be easily adjusted to provide a wide range of available positions for holding equipment in a stable, fixed position relative to a platform over long periods of use, even when subjected to shock and heavy vibration. In particular, rather than merely relying on friction fittings, in one embodiment, every adjustment point in embodiments of the present disclosure includes interconnecting teeth forming sets of ratcheting adjustment points that can be secured by one or more knobs or hand screws.

One embodiment of the present disclosure provides a vibration resistant, positionable equipment mount for mounting a piece of equipment relative to a vehicle in a manner that maintains the position of the piece of equipment relative to the vehicle in a vibrating environment. The equipment mount can include a platform mount, first ratcheting pivot clamp, an equipment mount, a second ratcheting pivot clamp, and one or more bars. The platform mount can be configured to be selectively coupled to a vehicle and can include a first splined shaft. The first ratcheting pivot clamp can be operably coupled to the platform mount and can be pivotable about the first splined shaft. The first ratcheting pivot clamp can include a plurality of teeth at least partially surrounding a first elbow pivot. The equipment mount can be configured to selectively couple to the piece of equipment, and can include a second splined shaft. The second ratcheting pivot clamp can be operably coupled to the equipment mount and can be pivotable about the second splined shaft. The second ratcheting pivot clamp can include a plurality of teeth at least partially surrounding a second elbow pivot. One or more bars can operably couple to the first and second ratcheting pivot clamps and pivot about the first and second elbow pivots.

In one embodiment, the vibration resistant, positionable equipment mount, via its first and second ratcheting pivot clamps and first and second elbow pivots, is configured to be positionable in a variety of configurations. In one embodiment, the vibration resistant, positionable equipment mount has 4-degrees of freedom, with each degree lockable to fix the vibration resistant, positionable equipment mount in a static position.

In one embodiment, the pivotable axis between the first ratcheting pivot clamp and the platform mount is substantially orthogonal to the pivotable access between the first ratcheting pivot clamp and the one or more bars. In one embodiment, the pivotable access between the second ratcheting pivot clamp and the equipment mount is substantially orthogonal to the pivotable access between the second ratcheting pivot clamp and the one or more bars. In one embodiment, the various components of the equipment mount can be locked in place relative to one another by the tightening of a first and second hand screw, thereby enabling the piece of equipment to be readily positioned according to the desires of a user.

In one embodiment, at least one of the platform mount and the first ratcheting pivot clamp and/or the equipment mount and the second ratcheting pivot clamp are in abutting contact with one another along a plane substantially orthogonal to the pivotable axis, thereby improving the support between the various components to reduce unwanted movement during heavy vibration. In one embodiment, at least one of the first and/or second splined shafts includes a reverse taper, such that a distal end of the splined shaft has a larger diameter than a proximal end of the splined shaft, thereby encouraging the platform mount and the first ratcheting pivot clamp and/or the equipment mount and the second ratcheting pivot clamp to remain in abutting contact with one another.

In one embodiment, the first and/or second ratcheting pivot clamps include an internal bore configured to receive the respective first or second splined shaft, wherein the internal bore includes one or more distinct, spaced apart sets of teeth configured to mesh with the splines of the respective first or second splined shaft, thereby reducing the manufacturing requirements of producing the ratcheting clamps. In one embodiment, the one or more distinct, spaced apart sets of teeth include convex, arcuate surfaces, thereby enabling the spaced apart sets of teeth and the splines of the respective shaft to pivot more easily relative to one another, while at the same time reducing the manufacturing requirements of producing the equipment mount.

Another embodiment of the present disclosure provides for a positionable equipment mount for mounting a piece of equipment relative to a platform in a manner that maintains the position of the piece of equipment relative to the platform in a vibrating environment. The positionable equipment mount includes a platform mount, an equipment mount, a first and second ratcheting pivot clamp, and a pair of bars. In one embodiment, the platform mount is fixedly coupled to the platform and includes a splined shaft. The first ratcheting pivot clamp has an internal bore sized to receive the splined shaft of the platform mount, thereby operably coupling the platform mount to the first ratcheting pivot clamp. The pair of bars are operably coupled to the first ratcheting pivot clamp via a first ratcheting elbow mount at a first end of the bars, and to the second ratcheting pivot clamp via a second ratcheting elbow mount at a second end of the bars. The second ratcheting pivot clamp has an internal bore sized to receive a splined shaft of an equipment mount, thereby operably coupling the second ratcheting pivot clamp to the equipment mount. The equipment mount is fixedly coupled to the piece of equipment.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 1A is a perspective view depicting a first embodiment of a positionable equipment mount in accordance with the disclosure.

FIG. 1D is a view depicting the back of the positionable equipment out of FIG. 1A.

FIG. 1E is a view depicting the left side of the positionable equipment out of FIG. 1A.

FIG. 1F is a view depicting the top of the positionable equipment out of FIG. 1A.

FIG. 1G is a view depicting the bottom of the positionable equipment out of FIG. 1A.

FIG. 2B is a view depicting the front of the positionable equipment out of FIG. 2A.

FIG. 2C is a view depicting the right side of the positionable equipment out of FIG. 2A.

FIG. 3A is a view depicting the front of a platform mount, first ratcheting pivot clamp and a portion of a pair of bars in accordance with an embodiment of the disclosure.

FIG. 3B is sectional view depicting a cross section of the platform mount and the first ratcheting pivot clamp of FIG. 3A.

FIG. 5 is a top view depicting a mounting plate in accordance with an embodiment of the disclosure.

FIG. 10 is a detail view depicting truncated teeth forming a part of a ratcheting elbow mount in accordance with an embodiment of the disclosure.

FIG. 11A is a perspective view depicting a base and a cross section of a ratcheting pivot clamp in accordance with an embodiment of the disclosure.

FIG. 11B is a perspective view depicting the base and ratcheting pivot clamp of FIG. 11A.

FIG. 12 is a view depicting the base and ratcheting pivot clamp of FIG. 11A.

FIG. 14A is a perspective view depicting an assembled positionable equipment mount in accordance with the disclosure.

FIG. 14B is an exploded perspective view depicting the positionable equipment mount of FIG. 14A.

FIG. 15 is a perspective view depicting a partially disassembled tubular grip, second ratcheting pivot clamp and a portion of a pair of bars in accordance with an embodiment of the disclosure.

FIG. 16 is a perspective view depicting the tubular grip, second ratcheting pivot clamp and portion of a pair of bars of FIG. 15, wherein the tubular grip is assembled.

FIG. 17 is a sectional, perspective view depicting a portion of an alternative embodiment of a tubular grip in accordance with the disclosure.

Figure 1C:
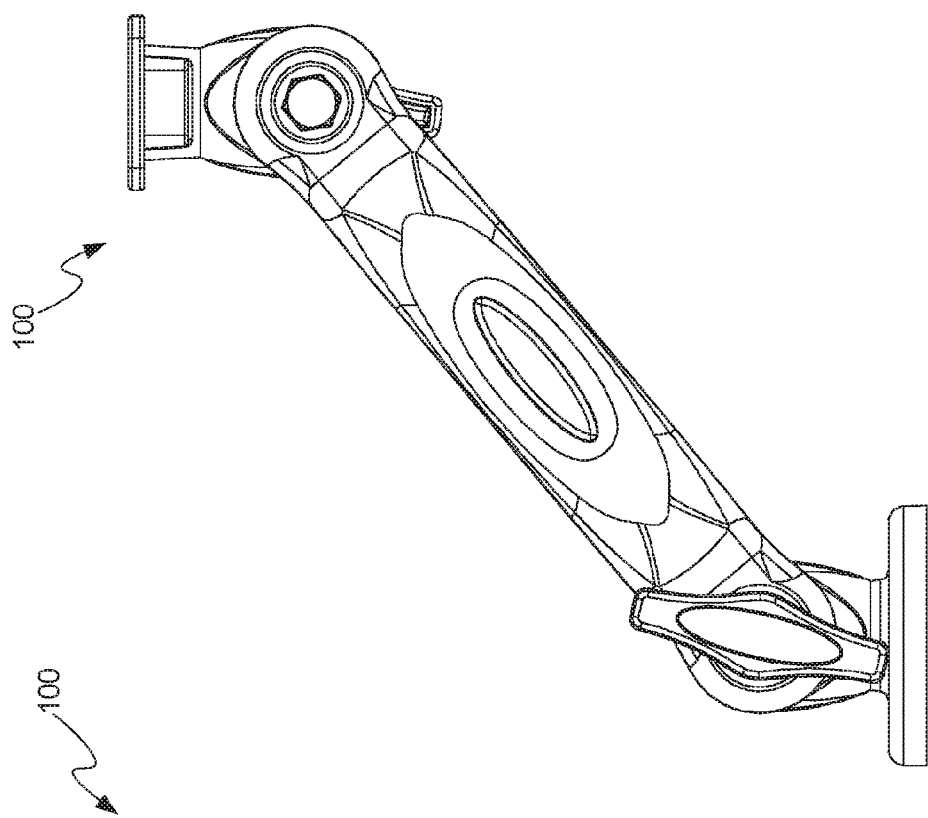
FIG. 1C is a view depicting the right side of the positionable equipment out of FIG. 1A.
Figure 1B:
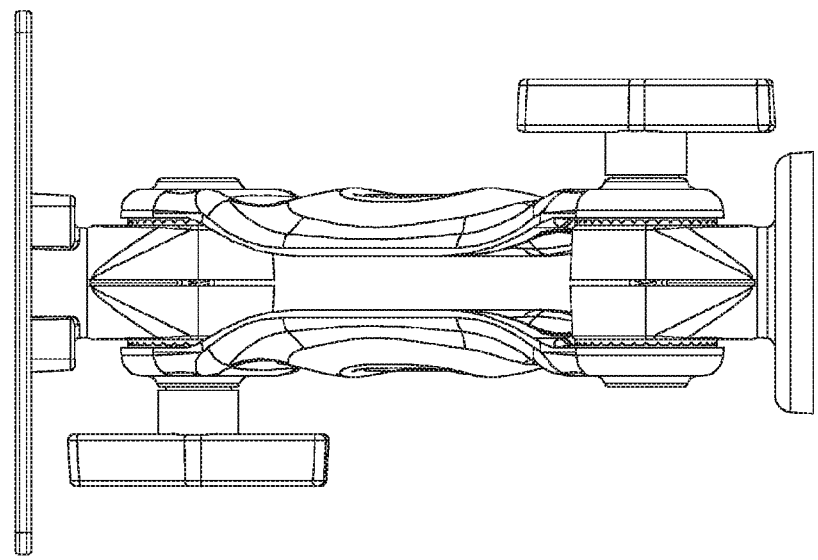
FIG. 1B is a view depicting the front of the positionable equipment out of FIG. 1A.

While embodiments of the disclosure are amenable to various modifications and alternative forms, specifics thereof are shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Referring to FIGS. 1A-G, a positionable equipment mount 100 is depicted in accordance with an embodiment of the disclosure. Positionable equipment mount 100 generally includes a platform mount 102, first ratcheting pivot clamp 104, second ratcheting pivot clamp 106, equipment mount 108, and a pair of bars 110A/110B. Referring to FIGS. 2A-G, a positionable equipment mount 100' according to a second embodiment of the disclosure is depicted. One difference between the embodiments depicted in FIGS. 1A-G and FIGS. 2A-G is the length of bars 110A/110B and 110A'/110B'.

In one embodiment, the positionable equipment mount 100 can be constructed of a corrosion resistant material, such that the positionable equipment mount 100 can resist corrosion after being subjected to corrosive elements, such as saltwater. In one embodiment, a company logo 107, trademark or advertizing can be affixed or operably coupled to an exterior surface of the positionable equipment mount 100.

Referring to FIGS. 3A and 3B, closer views of the platform mount 102 and first ratcheting pivot clamp 104 are depicted in accordance with an embodiment of the disclosure. Platform mount 102 can include a base 112 and a shaft 118 operably coupled to one another. Base 112 can be substantially planar on a bottom surface 114 or can be contoured to conform to a corresponding surface of a platform (not depicted). Base 112 can define one or more bores 116 through which a fastener, such as a screw or bolt can pass. Bore 116 can include an angular shoulder to enable a portion of a head of a fastener to reside within bore 116.

In one embodiment, base 112 can define a bore 119 through which a fastener 117 can pass. Bore 119 can include an angular shoulder to enable a portion of a head of the fastener to reside within bore 119. Bore 119 can vary in its diameter, such that in one embodiment, bore 119 can be configured to receive at least a portion of a proximal end 127 of shaft 118. Fastener 117 can extend into a blind bore 125 defined within shaft 118, thereby selectively coupling base 112 to shaft 118.

Figure 7:
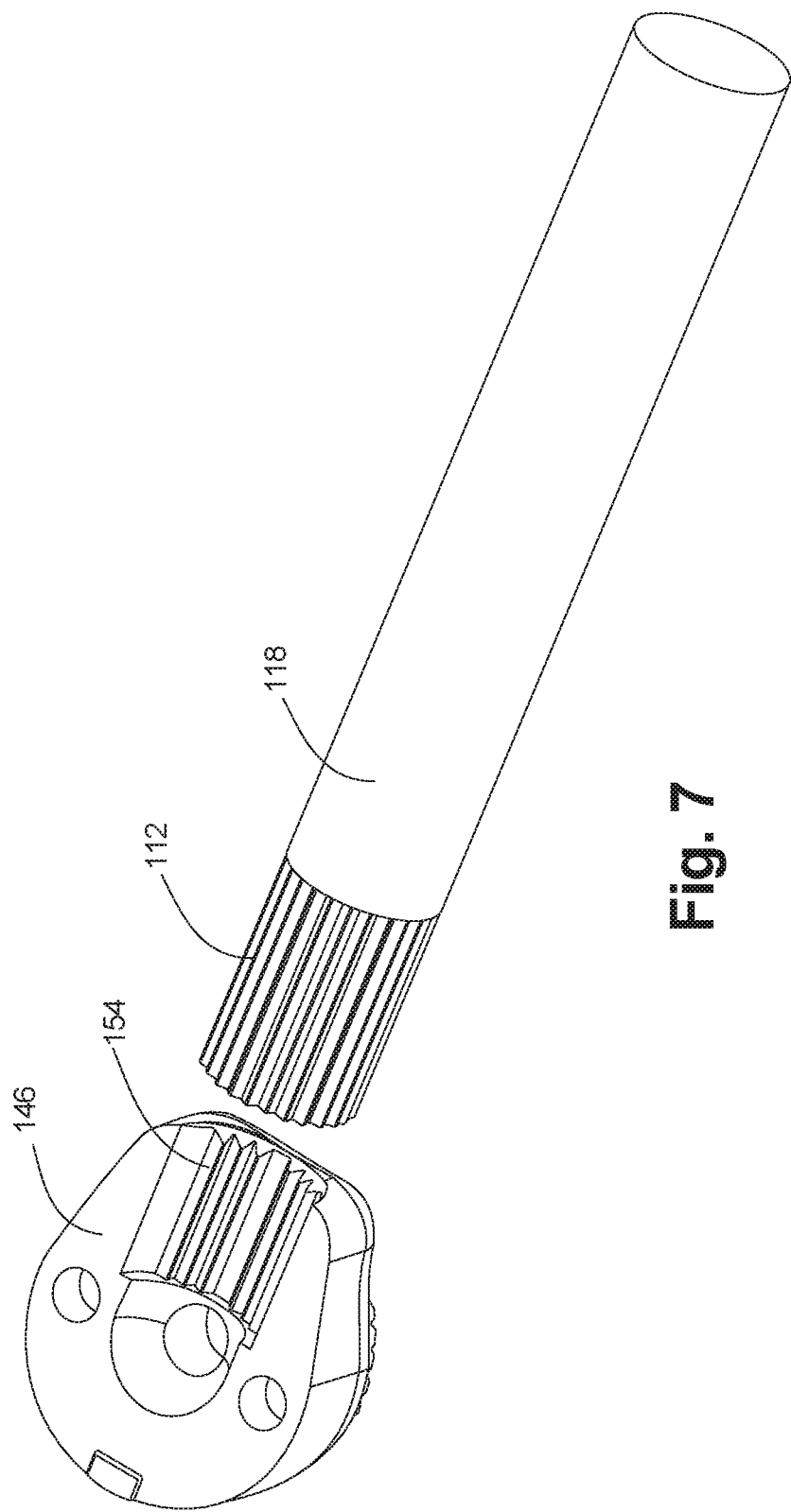
FIG. 7 is a perspective view depicting one side portion of a pivot clamp with an untapered shaft of a platform mount or equipment mount in accordance with an embodiment of the disclosure.

Shaft 118 can have a circumferential outer surface 120 defining a plurality of splines or teeth 122. In one embodiment, the circumferential outer surface 120 of shaft 118 can include a reverse taper, such that a diameter of the distal end 126 of shaft 118 is larger than a diameter of the proximal end 127 of shaft 118. In such an embodiment, the tapering of shaft 118 can inhibit movement relative to and/or separation of the first ratcheting pivot clamp 104 from base 112 when exposed to vibration. In other embodiments (as depicted in FIG. 7), the circumferential outer surface 120 of shaft 118 is not tapered.

In one embodiment, the platform mount 102 and the first ratcheting pivot clamp 104 are in abutting contact with one another along a plane substantially orthogonal to the axis of shaft 118, such that shaft 118 completely resides within platform mount 102 and/or first ratcheting clamp 104. In such an embodiment, the abutting contact can serve to further strengthen the assembly, thereby inhibiting unwanted movement when exposed to vibration.

Figure 2A:
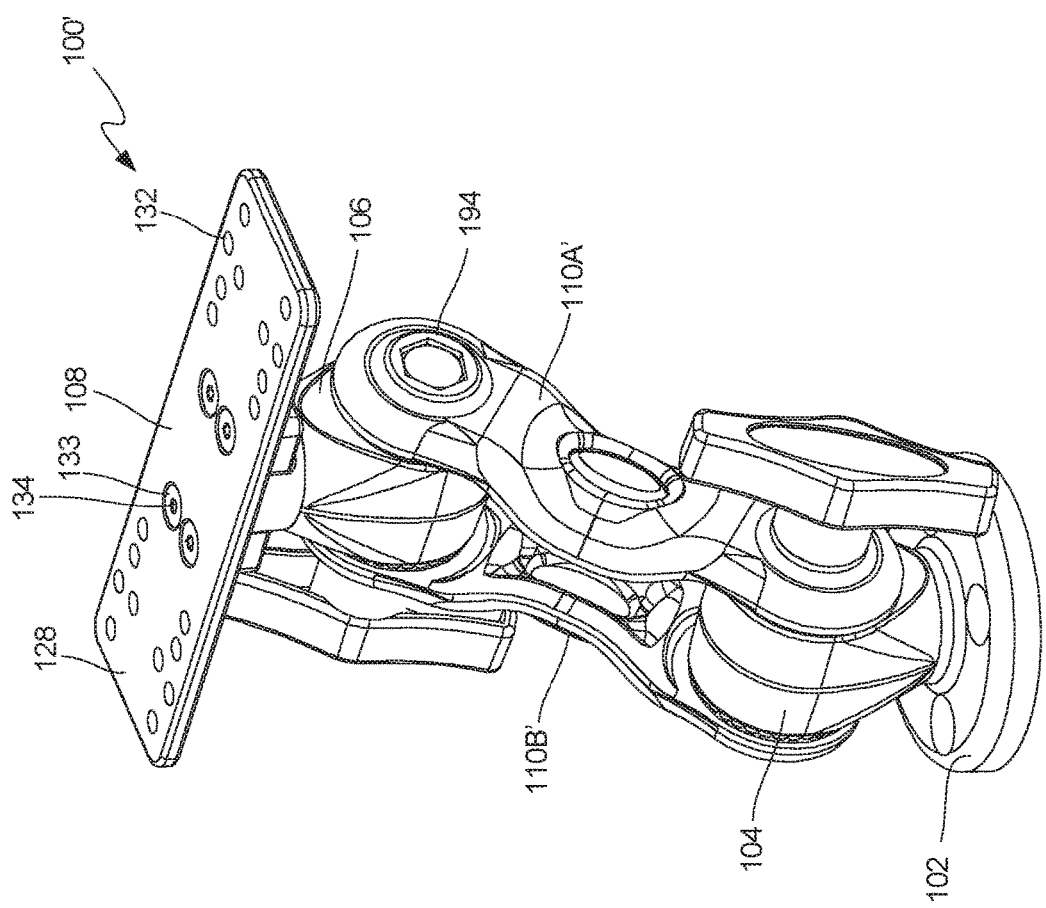
FIG. 2A is a perspective view depicting a second embodiment of a positionable equipment mount in accordance with the disclosure.
Figure 2D:
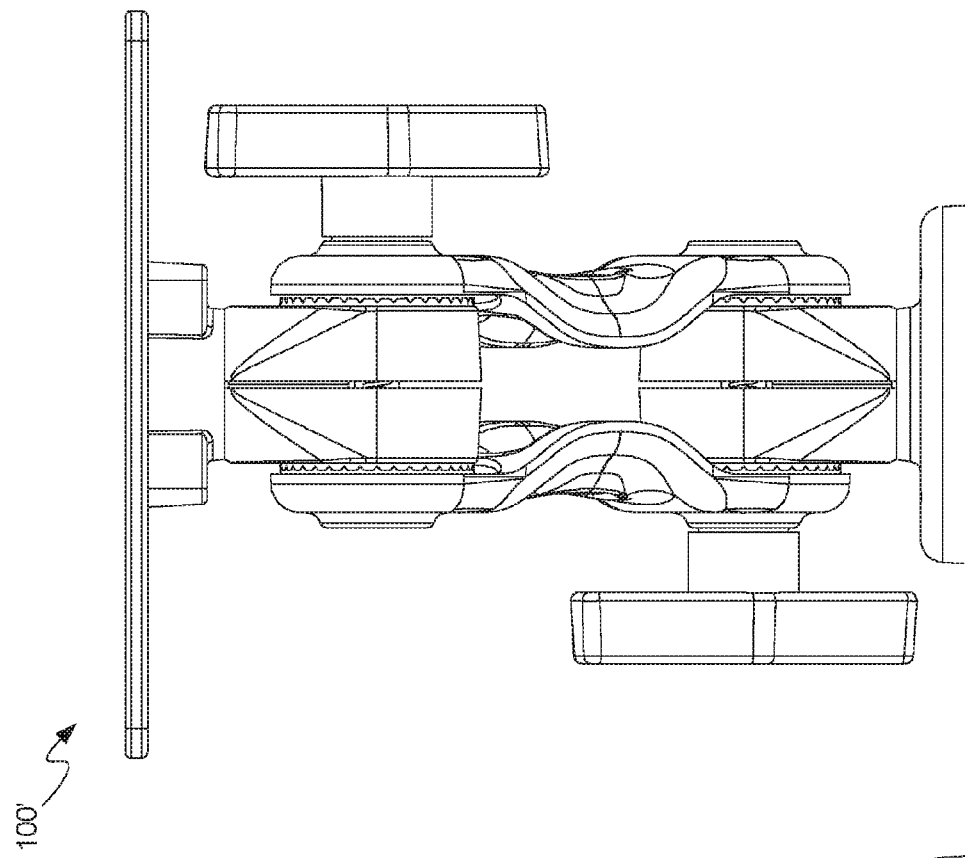
FIG. 2D is a view depicting the back of the positionable equipment out of FIG. 2A.
Figure 2E:
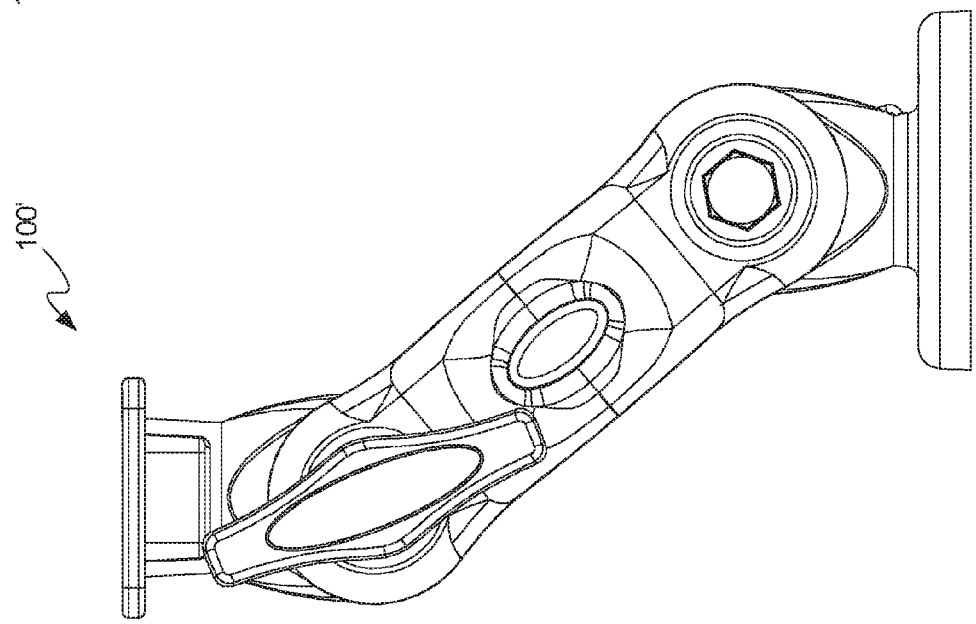
FIG. 2E is a view depicting the left side of the positionable equipment out of FIG. 2A.
Figure 2G:
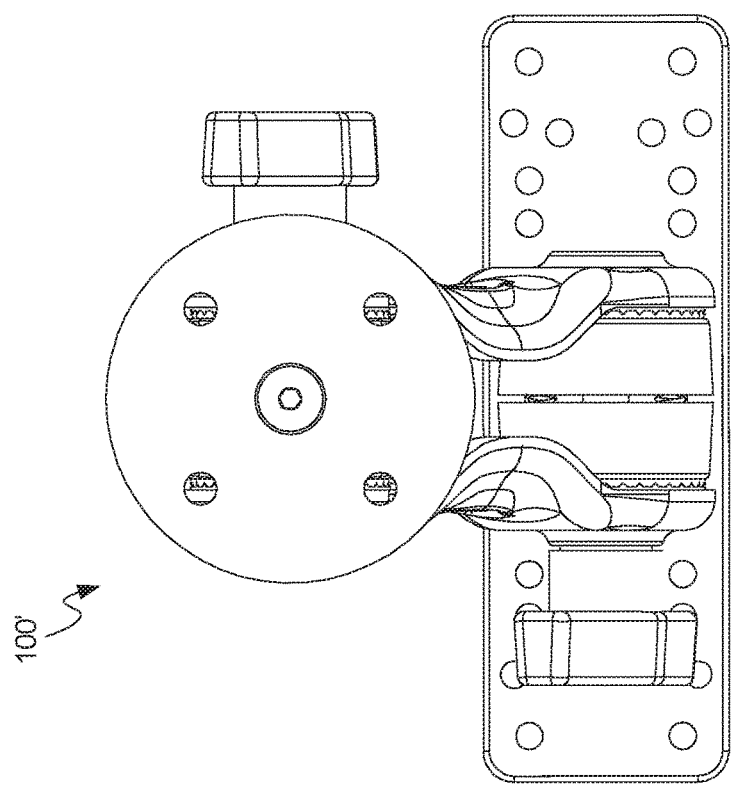
FIG. 2G is a view depicting the bottom of the positionable equipment out of FIG. 2A.
Figure 2F:
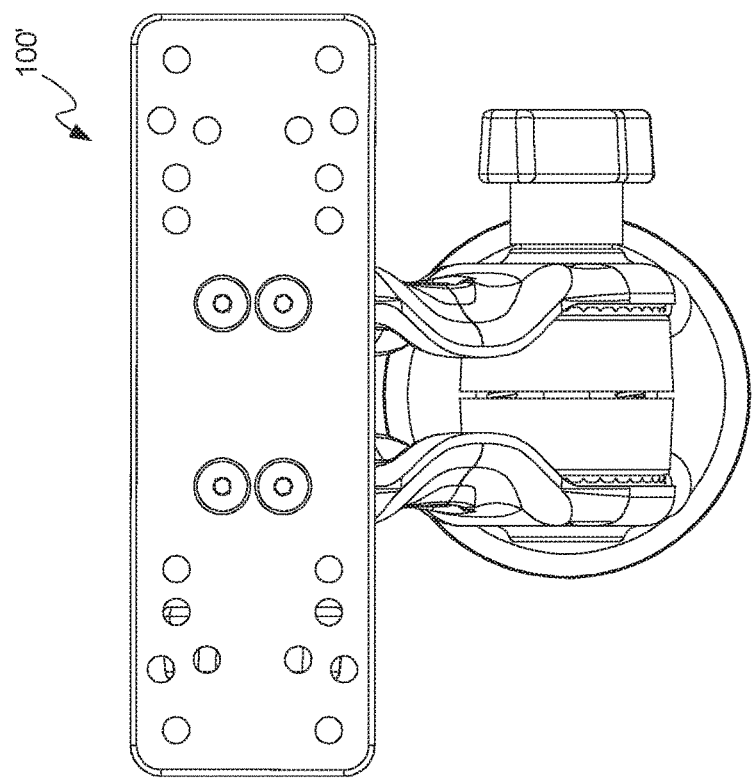
FIG. 2F is a view depicting the top of the positionable equipment out of FIG. 2A.
Figure 4B:
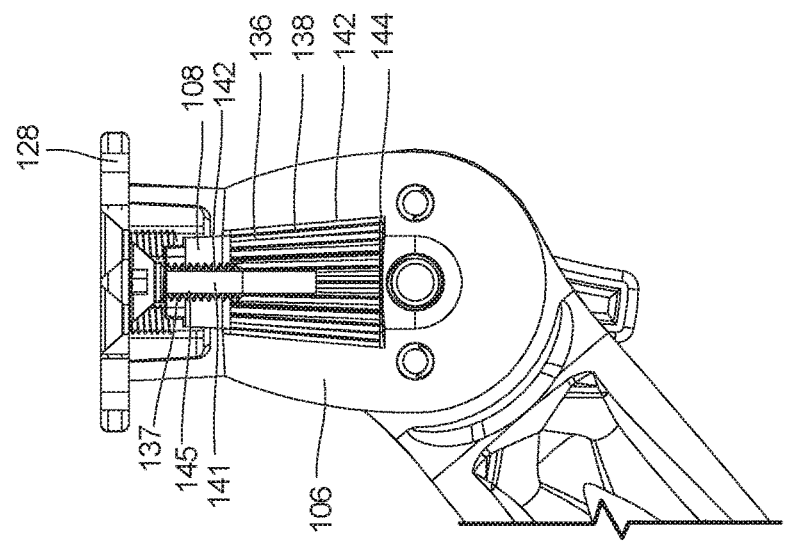
FIG. 4B is a sectional view depicting a cross-section of the equipment mount and the second ratcheting pivot clamp of FIG. 4A.
Figure 4A:
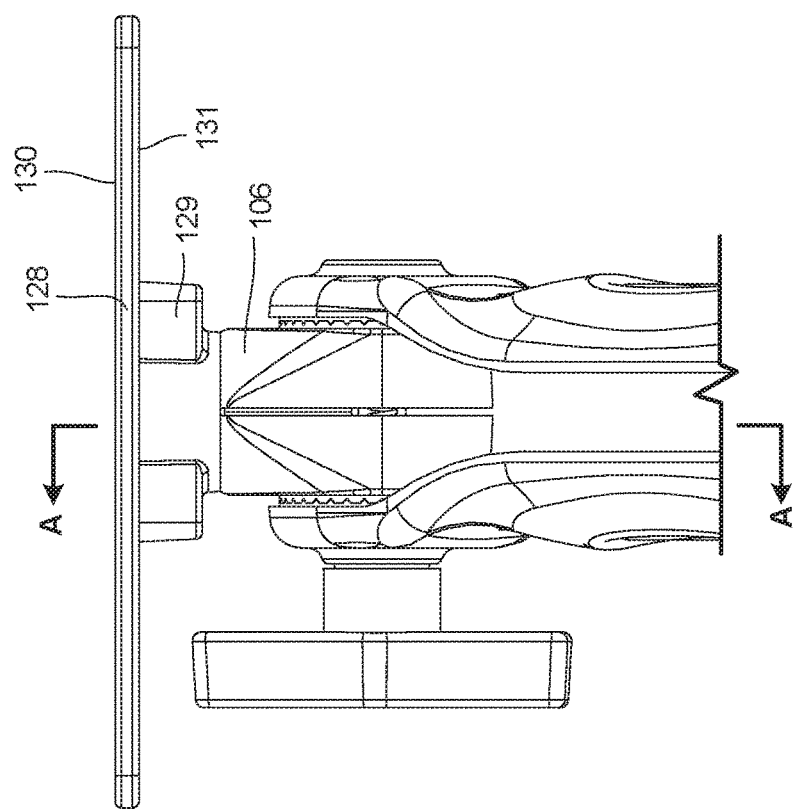
FIG. 4A is a view depicting the front of an equipment mount, second ratcheting pivot clamp and a portion of the pair of bars in accordance with an embodiment of the disclosure.

Referring to FIGS. 4A and 4B, closer views of the equipment mount 108 and the second ratcheting pivot clamp 106 are depicted in accordance with an embodiment of the disclosure. Equipment mount 108 can include a mounting plate 128, base 129 and shaft 136 operably coupled to one another. Mounting plate 128 can have a substantially planar top surface 130 or can be contoured to conform to a corresponding surface of a piece of equipment (not depicted). Base 129 can be operably coupled to the bottom surface 131 of mounting plate 128. For example, in one embodiment, mounting plate 128 defines one or more bores 133 (as depicted in FIGS. 1A and 2A) through which fasteners 134 can pass. Fastener 134 can extend into one or more blind bores 135 defined in base 129, thereby selectively coupling mounting plate 128 to base 129.

In one embodiment, base 129 can define a bore 137 through which fastener 141 can pass. Bore 137 can include an angular shoulder to enable a portion of a head of the fastener to reside within bore 137. Bore 137 can vary in its diameter, such that in one embodiment, bore 137 can be configured to receive at least a portion of the proximal end 145 of shaft 136. Fastener 141 can extend into a blind bore 142 defined within shaft 136, thereby selectively coupling base 126 to shaft 136.

Shaft 136 can have a circumferential outer surface 138 defining a plurality of teeth or splines 140. In one embodiment, the circumferential outer surface 138 of shaft 136 can include a reverse taper, such that a diameter of the distal end 144 of shaft 136 is larger than a diameter of the proximal and 145 of shaft 136. In such an embodiment, the tapering of shaft 136 can inhibit movement relative to and/or separation of the second ratcheting pivot clamp 106 from equipment mount 108 when exposed to vibration. In other embodiments (as depicted in FIG. 7), the circumferential outer surface 138 of shaft 136 is not tapered.

In one embodiment, the equipment mount 108 and the second ratcheting pivot clamp 106 are in abutting contact with one another along a plane substantially orthogonal to the axis of shaft 136, such that shaft 136 completely resides within equipment mount 108 and/or second ratcheting clamp 106. In such an embodiment, the abutting contact can serve to further strengthen the assembly, thereby inhibiting unwanted movement when exposed to vibration.

Referring to FIG. 5 a top view of an exemplary mounting plate 128 is depicted in accordance with an embodiment of the disclosure. In one embodiment, mounting plate 128 can be substantially rectangular in shape, and can include a plurality of bores 132 through which one or more fasteners (not depicted) can be used to secure a piece of equipment or device to mounting plate 128. The plurality of bores 132 can be configured in a pattern, such that a variety of devices can be coupled to mounting plate 128. In other embodiments, mounting plate 128 can be replaced with other attachments, selectively coupleable to other devices.

Figure 6:
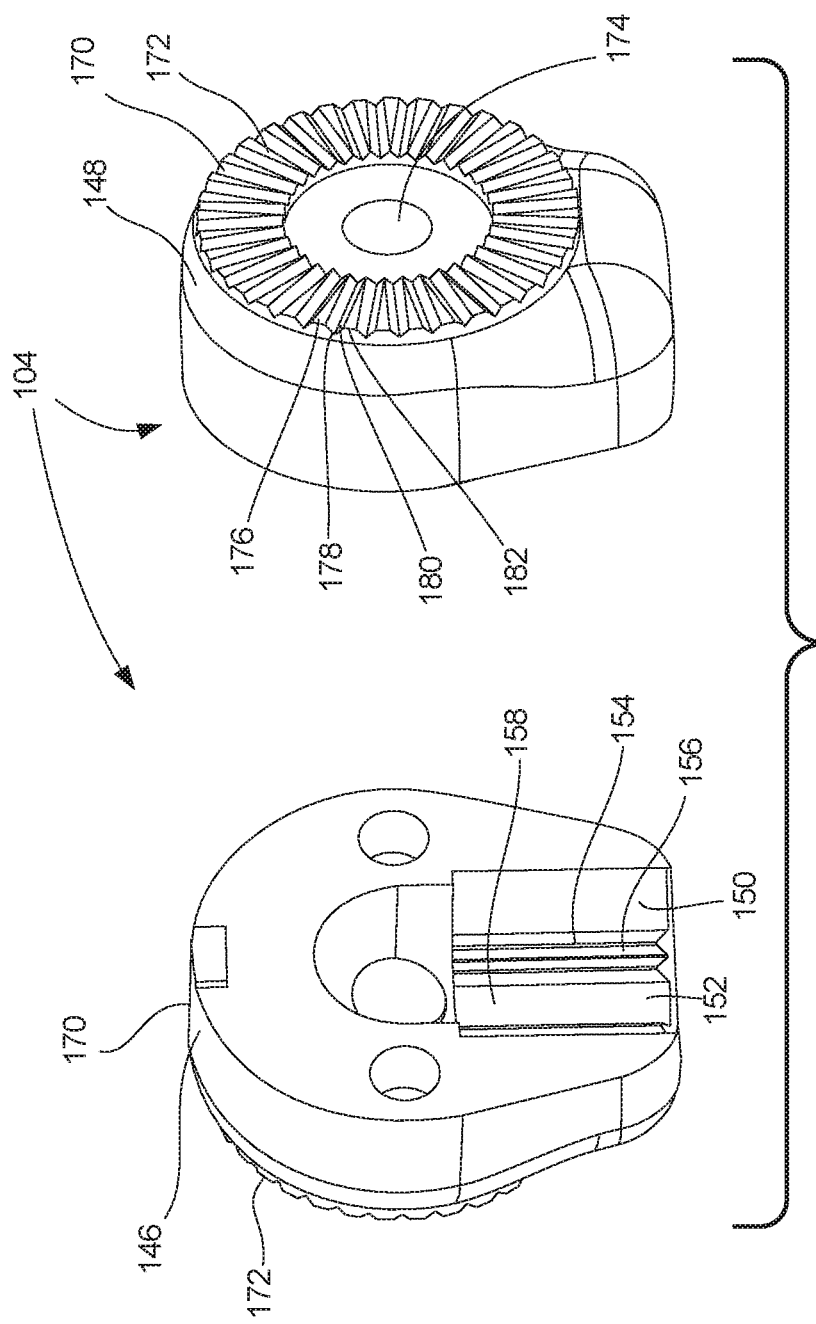
FIG. 6 is a perspective view depicting a left and right side portions of a ratcheting pivot clamp in accordance with an embodiment of the disclosure.

Referring to FIG. 6, a first ratcheting pivot clamp 104 is depicted in accordance with an embodiment of the disclosure. In one embodiment, the second ratcheting pivot clamp 106 can be substantially the same as the first ratcheting pivot clamp 104. First ratcheting pivot clamp 104 can be comprised of two portions, a left side portion 146 and a right side portion 148. Left side portion 146 and right side portion can substantially mirror one another in structure. In one embodiment, the two portions of first ratcheting pivot clamp 104 are positioned together when positionable equipment mount 100 is assembled, thereby forming an internal bore 150. Internal bore 150 can be sized to accommodate a portion of shaft 118 or shaft 136, so that either platform mount 102 or equipment mount 108 can be operably coupled to ratcheting pivot clamp 104.

In one embodiment, internal bore 150 includes an interior circumferential surface 152. With additional reference to FIG. 7, which depicts a left side 146 of a ratcheting pivot clamp 104 and a shaft 118, the interior circumferential surface 152 can be characterized by teeth 154 configured to mesh or interact with teeth 112 or teeth 140. In one embodiment, teeth 154 can be grouped together in distinct sets of teeth 156. Sets of teeth 156 can be comprised of a plurality of teeth 154, for example two or three teeth 154. Each set of teeth 156 can be distinct from an adjacent set of teeth 156 by separating the sets of teeth by a space wherein no teeth 154 are present. For example, in one embodiment, the entire interior circumferential surface 152 can include a plurality of distinct sets of teeth 154, for example two or four sets of teeth 154, spaced apart, with substantially smooth, toothless portions 158 on the interior circumferential surface 152 positioned there between. In such an embodiment, by reducing the number of teeth 154 required to be formed on first ratcheting pivot clamp 104, the production requirements can be reduced. Additionally, positioning fewer teeth 154 in distinct clusters or sets 156 enables proper ratcheting without the need to maintain the degree of precision in manufacturing necessary to ensure that every tooth 122/140 surrounding shaft 118/136 is able to mesh with a corresponding tooth of the internal bore 150.

Figure 8:
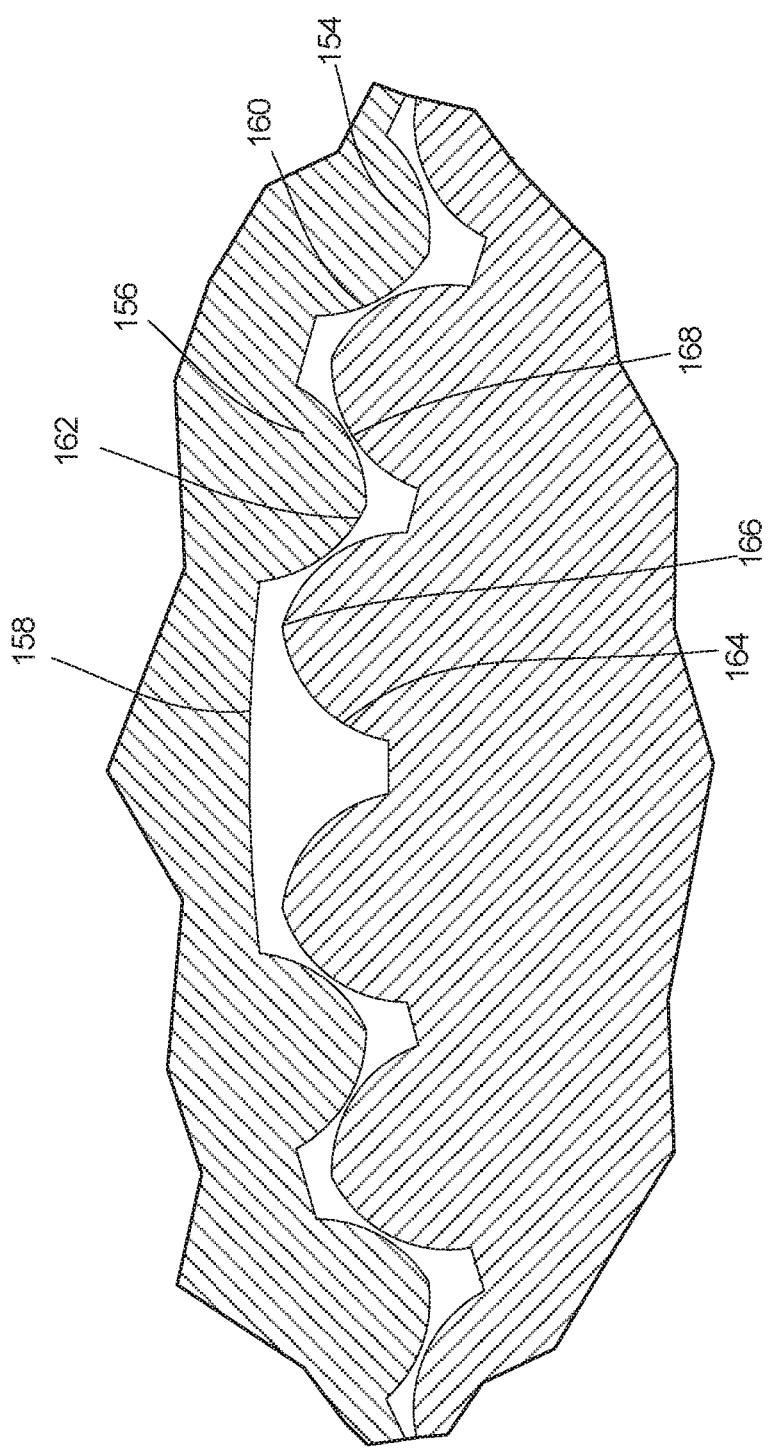
FIG. 8 is a detail view depicting sets of arcuate teeth of a ratcheting pivot clamp meshing with arcuate teeth of a shaft of a platform mount or equipment mount in accordance with an embodiment of the disclosure.

Referring to FIG. 8, the interaction of teeth 154 with teeth 122 or teeth 140 is depicted in accordance with an embodiment of the disclosure. In one embodiment, the surfaces 160 of teeth 154 are arcuate in nature, including a filleted crown or peak 162. In one embodiment, teeth 122 and teeth 140 can also include arcuate surfaces 164, including filleted crowns or peaks 166. In such an embodiment, the spaced apart sets of teeth 156 and the arcuate surfaces 160 of the teeth enable the equipment mount to be produced at increased tolerances. In such an embodiment, the arcuate or curved surfaces 160, 164 can meet across a line of intersection 168, instead of two flat surfaces meeting across a plane of intersection, thereby providing less opportunity for imperfections to cause misalignment or non-uniform contact. Accordingly, the arcuate surfaces 160, 164 of the teeth 122/140 enable increased tolerances, by requiring that a minimized surface area 168 along the arcuate surface 160 make contact with the corresponding arcuate surface 164 of the corresponding tooth in order to ensure proper ratcheting, as well as a tight fitting between the clamp 104, 106 and the shaft 118, 136 along the axis of the shaft. The arcuate surfaces 160, 164 of the teeth also enable smoother ratcheting, as the respective crowns 162, 166 are able to traverse along the arcuate surfaces 160, 164 more easily. The arcuate surfaces 160, 164 also minimizes the separation needed between the left and right side portions 146, 148 of pivot clamp 104, 106 to affect ratcheting adjustment.

Figure 9B:
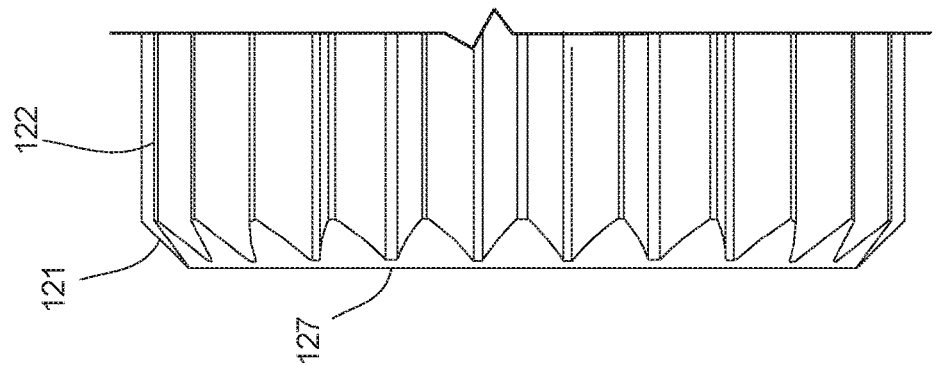
FIG. 9B is a view depicting the profile of the shaft of FIG. 9A.
Figure 9A:
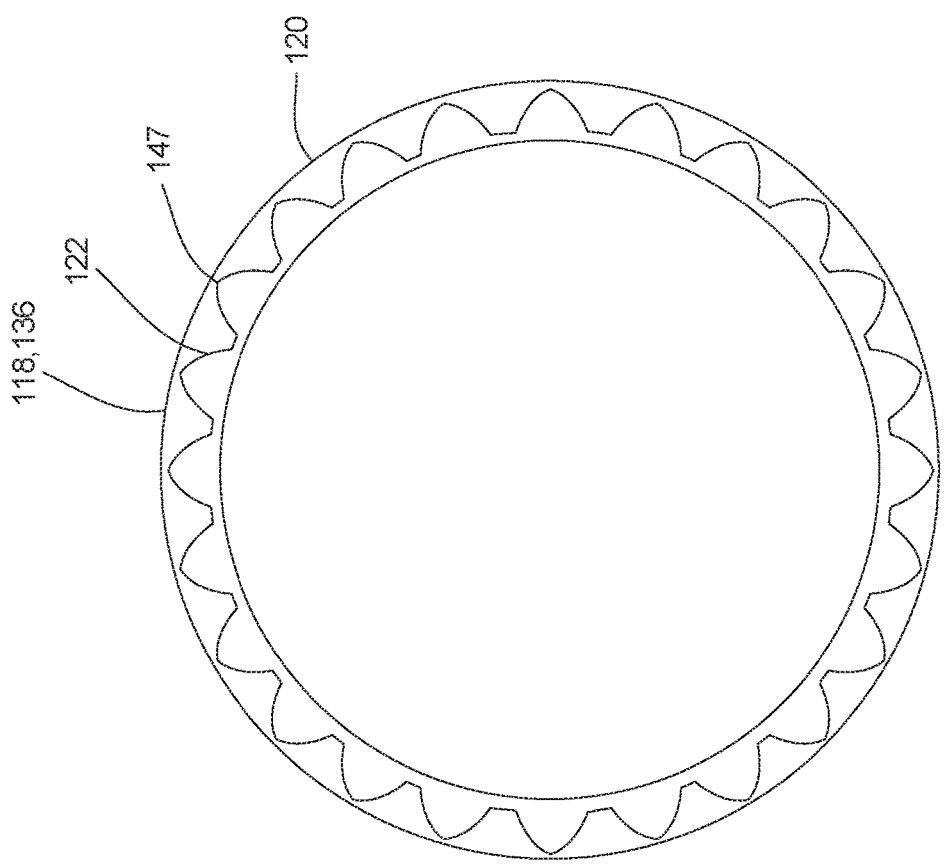
FIG. 9A is a view depicting the distal end of a shaft of a platform mount or equipment mount in accordance with an embodiment of the disclosure.

Referring to FIGS. 9A-B, a distal end 127 of shaft 118 is depicted in accordance with an embodiment of the disclosure. In one embodiment, teeth 122 can be countersunk into the surface of shaft 118, such that the peak or crown 147 of teeth 122 do not extend beyond the circumferential outer surface 120 of shaft 118. In one embodiment, teeth 122 can include a chamfered distal end 121.

Referring again to FIG. 6, the outer surface 170 of both sides 146, 148 of pivot clamp 104 can include sets of teeth 172 comprising part of a ratcheting elbow mount 174. Each set of teeth 172 can be configured in a ring surrounding a central bore 174. In one embodiment, the width of the base 178 of each tooth 176 can increase as its distance from the central bore 174 increases. Where the angle of the sides 180 of the teeth 176 remain constant, the crown 192 can be truncated in order to prevent the peak or crown 182 furthest from the central bore 174 from having a higher elevation than the portion of the tooth 176 nearest to the central bore 174. FIG. 10 depicts a closer view of the truncated teeth 172 in accordance with an embodiment of the disclosure. Such a configuration enables smoother ratcheting while minimizing the separation needed between bars 110A and 110B to affect ratcheting adjustment.

Referring to FIGS. 11A-12, coupling of the shaft 136 of base 129 to the second ratcheting pivot clamp 106 is depicted in accordance with an embodiment of the disclosure. In embodiments where shaft 136 includes a reverse taper, the width of the base 139 of each tooth 140 can increase in size along the length of shaft 136, such that the base 139 is narrowest in proximity to the proximal end 145 of shaft 136 and widest in proximity to the distal end 144 of shaft 136. Where the angle of the sides 143 of the teeth 140 remain constant, the crown 147 can be truncated in order to prevent the peak or crown 147 nearest to the distal end 144 from having a higher elevation than the portion of the teeth 140 nearest to the proximal end 145.

In one embodiment, the entire peak or crown 147 along the length of teeth 140 can be truncated, such that one or more voids 149 exist between the one or more teeth 140 of shaft 136 and the ratcheting pivot clamp 104, 106 along the length of shaft 136, when the shaft 136 is coupled to the ratcheting pivot clamp 104, 106. In such an environment, the one or more voids 149 inhibit interference of the peak or crown 147 with the internal circumferential surface 152 of the ratcheting pivot clamp 104, 106, thereby improving the contact between the faces or sides 143 of the teeth 140 and the respective faces or sides 143 of teeth 154 of the ratcheting pivot clamp 104, 106. In one embodiment, the peak or crown of teeth 154 of the ratcheting pivot clamp 104, 106 can also be truncated.

In one embodiment, the internal bore 150 can vary in diameter, such that the internal circumferential surface 152, where no teeth 154 are present, can be sized to fit with the truncated peak or crown 147 of the teeth 140 of shaft 136. Such a configuration further aids in immobilizing shaft 136 relative to the ratcheting pivot clamp 104, 106 when coupled together, particularly when exposed to vibration.

Figure 13B:
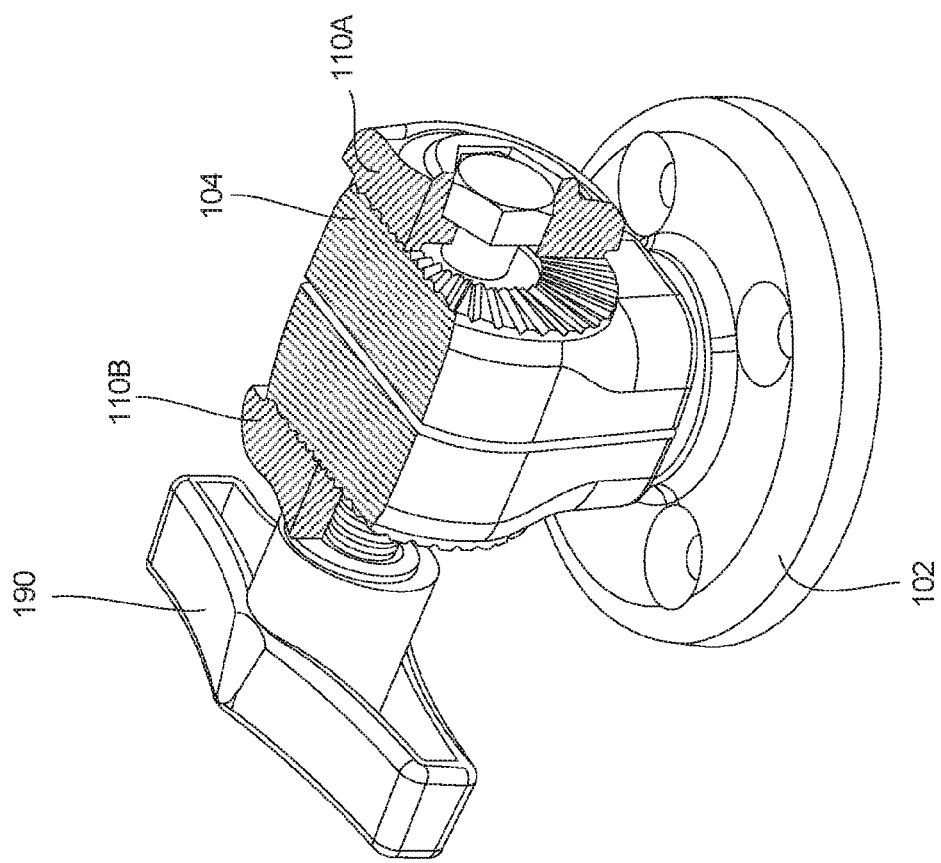
FIG. 13B is perspective view depicting the platform mount and cross sections of the ratcheting pivot clamp and bars of FIG. 13A.
Figure 13A:
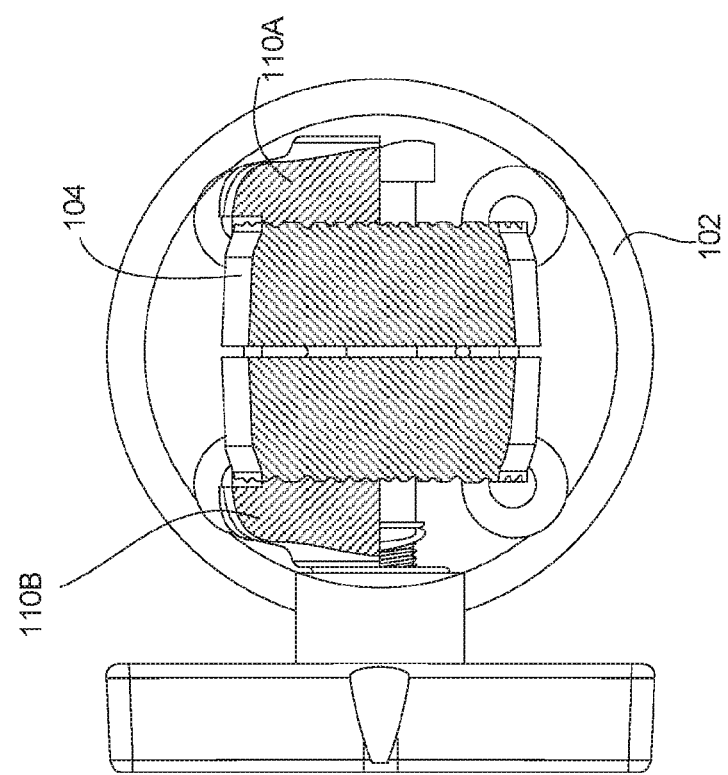
FIG. 13A is a view depicting a platform mount and a cross section of a ratcheting pivot clamp and bars in accordance with an embodiment of the disclosure.

Referring to FIGS. 13A-B, cross-sectional views of the first ratcheting pivot clamp 104 coupled with platform mount 102 and bars 110A/B are depicted in accordance with an embodiment of the disclosure. In this embodiment, the tightening of hand screw 190 can cause the left side 146 and the right side 148 of the first ratcheting pivot clamp 104 to squeeze the shaft 118 of platform mount 102, and can cause the bars 110A/B to squeeze the first ratcheting of the clamp 104, thereby locking each of these components in position relative to one another.

Referring to FIGS. 14A-B, assembled and exploded views of a positionable equipment mount 100 are depicted in accordance with an embodiment of the disclosure. The various components of equipment mount 100 can be assembled via fastener 184, such as a threaded bolt. In one embodiment, fastener 184 traverses through: a bore 186A in the right bar of the pair of bars 110A; the centralized bore 174A of right side portion 148 of ratcheting pivot clamp; the centralized bore 174B of left side portion 148 of ratcheting pivot clamp; a bore 186B in the left bar of the pair of bars 110A; a spring 188; and a washer 189. In one embodiment, the end of fastener 184 is secured via a knob or hand screw 190. In one embodiment, bar 110 can include a blind bore 192 sized to accommodate the head 194 of fastener 184 for inhibiting the fastener 184 from spinning when the head 194 is positioned at least partly within blind bore 192. For example, in one embodiment, blind bore 192 can be configured to at least partially accommodate a hexagon bolt head therein.

A spring 188 can be configured to exert a biasing force to the assembly, thereby forcing the two halves of the bar 110 together when the equipment mount 100 is assembled. This biasing force enables proper ratcheting of the elbow mounts 174 and the ratcheting pivot clamp when the hand screw 190 is partially loosened.

The right and left portions 146, 148 can each include one or more bores 194 sized to accommodate one or more springs 196. Springs 196 can be configured to exert a biasing force to the right and left portions 146, 148, thereby forcing the right and left portions 146, 148 apart when the equipment mount 100 is assembled. This biasing force eases proper ratcheting of the ratcheting pivot clamp when the hand screw 190 is loosened.

Referring to FIGS. 15-17, a tubular grip 202 is depicted in accordance with an embodiment of the disclosure. In one embodiment, the mounting plate 128 and base 129 of the equipment mount 108 can be replaced with tubular grip 202. Tubular grip 202 can be configured to mount pieces of equipment having a tubular profile, such as a trolling motor.

Tubular grip 202 can be comprised of a lower portion 204 and an upper portion 206 pivotably coupled to one another by hinge 208, thereby enabling the lower portion 204 and the upper portion 206 to pivot relative to one another, such that a piece of equipment can be inserted therebetween. In one embodiment, the lower portion 204 and the upper portion 206 can overlap via a tongue and groove assembly for improved strength and durability. Similar to base 129, the lower portion 204 can define a bore 210 configured to accommodate at least a portion of shaft 136. A fastener 212 can be configured to secure lower portion 204 to shaft 136.

In one embodiment, the lower portion 204 and the upper portion 206 can include a recessed portion 214 configured to retain insert grip 216. Insert grip 216 can be configured to improve the gripping surface between tubular grip 202 and the piece of equipment. For example, in one embodiment, insert grip 216 is constructed of rubber and includes a plurality of treads for improved positioning within recessed portion 214 while maintaining surface contact with the piece of equipment.

In one embodiment, tubular grip 202 can include a lock 218, configured to lock the lower portion 204 and the upper portion 206 relative to one another in the equipment gripping position. For example, lock 218 can be positioned opposite hinge 208. A pin 220 can be used to secure lock 218 in the equipment gripping position. In one embodiment, a tether 222 can couple pin 220 to either lower portion 204 or upper portion 206.

In operation, a user mounts the platform mount 102 to a platform and the equipment mount 108 to a piece of equipment desired to be mounted to the platform. With the fastener 184 in place and the hand screw 190 loosened, the platform mount 102 and the equipment mount 108 can be inserted into the respective internal bores 150 of the first and second ratcheting pivot clamps 104, 106. The position of the piece of equipment relative to the platform can be adjusted by ratcheting the pivot clamps 104, 106 and the elbow mounts 174 into their respective desired positions. The position can be secured by tightening the knob or hand screw 190.

When a user desires to adjust the position of the piece of equipment relative to the platform, the user can loosen the hand screw 190, thereby permitting the pivot clamp 104, 106 and elbow mounts 174 associated with that hand screw 190 to be ratcheted into a desired position. The disclosed groupings of distinct sets of teeth 156, arcuate surfaces of the teeth 160 and truncated crowns of the teeth 182 enable proper ratcheting with minimized gaps between components. The minimized gaps reduce the amount that hand screw 190 needs to be loosened, thereby simplifying the task of adjusting the equipment mount 100. The spring 188 included in the assembly exerts a biasing force to enable the equipment mount 100 to maintain its position while being adjusted, thereby reducing the need for the user to support the equipment during adjustment. When the position of the piece of equipment has been properly adjusted relative to the platform, hand screw 190 can be tightened. In this manner, the position of the piece of equipment is locked in place relative to the platform, such that unwanted movement of the piece of equipment is reduced or inhibited, particularly when subjected to heavy vibration and shock.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A vibration resistant, positionable equipment mount for mounting a piece of equipment relative to a vehicle in a manner that maintains the position of the piece of equipment relative to the vehicle in a vibrating environment, the vibration resistant positionable equipment mount comprising:
   a platform mount configured to be selectively coupled to a vehicle, the platform mount including a first splined shaft;
   a first ratcheting pivot clamp operably coupled to the platform mount and pivotable about the first splined shaft, the first ratcheting pivot clamp including a plurality of teeth at least partially surrounding a first elbow pivot;
   an equipment mount configured to be selectively coupled to the piece of equipment, the equipment mount including a second splined shaft;
   a second ratcheting pivot clamp operably coupled to the equipment mount and pivotable about the second splined shaft, the second ratcheting pivot clamp including a plurality of teeth at least partially surrounding a second elbow pivot; and
   one or more bars operably coupled to and extending between the first and second ratcheting pivot clamps and pivotable about the first and second elbow pivots,
   wherein at least one of the first and second ratcheting pivot clamps is comprised of two portions biased apart by at least one spring positioned therebetween.

2. The vibration resistant, positionable equipment mount of claim 1, wherein at least one of
   the pivotable axis between the first ratcheting pivot clamp and the platform mount is substantially orthogonal to the pivotable axis between the first ratcheting pivot clamp and the one or more bars, and
   the pivotable axis between the second ratcheting pivot clamp and the equipment mount is substantially orthogonal to the pivotable axis between the second ratcheting pivot clamp and the one or more bars.

3. The vibration resistant, positionable equipment mount of claim 1, wherein at least one of the first and second splined shafts has a reverse taper, such that a distal end of the splined shaft has a larger diameter than a proximal end of the splined shaft.

4. The vibration resistant, positionable equipment mount of claim 1, wherein at least one of the first and second ratcheting pivot clamps defines an internal bore configured to receive the respective first or second splined shaft.

5. The vibration resistant, positionable equipment mount of claim 4, wherein the internal bore of at least one of the first and second ratcheting pivot clamps includes one or more distinct, spaced apart sets of teeth configured to mesh with splines of the respective first or second splined shaft.

6. The vibration resistant, positionable equipment mount of claim 5, wherein the teeth of the first or second ratcheting pivot clamp include convex, arcuate surfaces.

7. The vibration resistant, positionable equipment mount of claim 1, wherein at least one of the platform mount and the first ratcheting pivot clamp, and the equipment mount and the second ratcheting pivot clamp are in abutting contact with one another along a plane substantially orthogonal to the pivotable axis.

8. The vibration resistant, positionable equipment mount of claim 1, wherein the teeth at least partially surrounding at least one of the first and second elbow pivots include crowns that are at least partially truncated.

9. The vibration resistant, positionable equipment mount of claim 1, wherein one of the platform mount and first ratcheting pivot clamp, and the equipment mount and the second ratcheting clamp are locked in position relative to one another and the one or more bars by the tightening of a hand screw.

10. A positionable equipment mount for mounting a piece of equipment relative to a platform, the positionable equipment mount comprising:
    a platform mount fixedly coupled to the platform, the platform mount including a splined shaft;
    a first ratcheting pivot clamp having an internal bore sized to receive and operably coupled to the splined shaft of the platform mount;
    a pair of bars operably coupled to the first ratcheting pivot clamp via a ratcheting elbow mount at a first end, and operably coupled to a second ratcheting pivot clamp via a ratcheting elbow mount at a second end;
    the second ratcheting pivot clamp having an internal bore sized to receive and operably coupled to a splined shaft of an equipment mount;
    the equipment mount fixedly coupled to the piece of equipment;
    wherein the internal bore of the first and second pivot clamps each have an interior circumferential surface characterized by a plurality of teeth configured to mesh with the splines of the respective splined shafts of the platform and equipment mounts, thereby forming ratcheting pivots,
    wherein at least one of the first and second ratcheting pivot clamps is comprised of two portions biased apart by at least one spring positioned therebetween.

11. The positionable equipment mount of claim 10, wherein at least one of
    the pivotable axis of the ratcheting pivot between the first ratcheting pivot clamp and the platform mount is substantially orthogonal to the pivotable axis of the ratcheting elbow between the first ratcheting pivot clamp and the one or more bars, and
    the pivotable axis of the ratcheting pivot between the second ratcheting pivot clamp and the equipment mount is substantially orthogonal to the pivotable axis of the ratcheting elbow between the second ratcheting pivot clamp and the one or more bars.

12. The positionable equipment mount of claim 10, wherein at least one of the splined shaft of the platform mount and the splined shaft of the equipment mount has a reverse taper, such that a distal end of the splined shaft has a larger diameter than a proximal end of the splined shaft.

13. The positionable equipment mount of claim 10, wherein the internal bore of at least one of the first and second ratcheting pivot clamps includes one or more distinct, spaced apart sets of teeth configured to mesh with splines of the respective splined shaft of the platform or equipment mount.

14. The positionable equipment mount of claim 10, wherein the teeth of the first or second ratcheting pivot clamp include convex, arcuate surfaces.

15. The positionable equipment mount of claim 10, wherein at least one of the platform mount and the first ratcheting pivot clamp, and the equipment mount and the second ratcheting pivot clamp are in abutting contact with one another along a plane substantially orthogonal to the pivotable axis of the ratcheting pivot.

16. The positionable equipment mount of claim 10, wherein a plurality of teeth at least partially surround the elbow mount between the pair of bars and at least one of the first and second ratcheting pivot clamps.

17. The positionable equipment mount of claim 16, wherein the teeth at least partially surrounding at least one of the first and second elbow pivots include crowns that are at least partially truncated.

18. The positionable equipment mount of claim 10, wherein one of the platform mount and first ratcheting pivot clamp, and the equipment mount and the second ratcheting clamp are locked in position relative to one another and pair of bars by the tightening of a hand screw.

* * * * *